(12) United States Patent
Balooch et al.

(10) Patent No.: US 11,315,159 B2
(45) Date of Patent: *Apr. 26, 2022

(54) SYSTEM FOR DETERMINING, DISPENSING, AND MIXING BLENDED COMPOSITION FOR SKIN TREATMENT

(71) Applicant: L'OREAL, Paris (FR)

(72) Inventors: Guive Balooch, New York, NY (US); Florent Valceschini, Paris (FR); Rishabh Bhandari, San Francisco, CA (US); Catherine Chiou, Saddle Brook, NJ (US); Sonia Lorente Gonzalez, Vincennes (FR); Pinida Jan Moolsintong, San Francisco, CA (US); David John Rinaldis, Redwood City, CA (US); Jonathan Scott Tang, San Francisco, CA (US); Brent Edward Timberlake, Oakland, CA (US); Andre Yousefi, San Francisco, CA (US)

(73) Assignee: L'OREAL, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 16/811,104

(22) Filed: Mar. 6, 2020

(65) Prior Publication Data

US 2020/0211078 A1 Jul. 2, 2020

Related U.S. Application Data

(63) Continuation of application No. 14/956,133, filed on Dec. 1, 2015, now Pat. No. 10,607,269.

(51) Int. Cl.
*G07F 13/06* (2006.01)
*G06Q 30/06* (2012.01)
(Continued)

(52) U.S. Cl.
CPC ........ *G06Q 30/0621* (2013.01); *B01F 29/10* (2022.01); *B01F 33/841* (2022.01);
(Continued)

(58) Field of Classification Search
CPC ... G07F 13/06; B01F 13/1063; B01F 13/1055
(Continued)

(56) References Cited

U.S. PATENT DOCUMENTS 5,785,960 A 7/1998 Rigg
6,412,658 B1 7/2002 Bartholomew et al.
(Continued)

FOREIGN PATENT DOCUMENTS

EP 1 093 842 B1 5/2003
JP 9-225008 9/1997
(Continued)

OTHER PUBLICATIONS

Combined Chinese Office Action and Search Report dated Aug. 31, 2020 in Chinese Patent Application No. 201680070585.1 (with English translation of Category of Cited Documents), 11 pages.
(Continued)

*Primary Examiner* — Timothy R Waggoner
(74) *Attorney, Agent, or Firm* — Oblon, McClelland, Maier & Neustadt, L.L.P.

(57) ABSTRACT

A system and method is provided for providing a cosmetic composition to a user. The system includes an apparatus configured to dispense at least one cosmetic composition into a output container; a user interface configured to receive information about the user; and circuitry configured to receive the information about the user and determine one or more cosmetic compositions to be dispensed into the output container based on the information about the user received at the user interface.

19 Claims, 30 Drawing Sheets
(21 of 30 Drawing Sheet(s) Filed in Color)

(51) Int. Cl.
  *G07F 17/18* (2006.01)
  *B01F 29/10* (2022.01)
  *B01F 33/841* (2022.01)
  *B01F 33/84* (2022.01)

(52) U.S. Cl.
  CPC ....... *B01F 33/846* (2022.01); *G06Q 30/0641* (2013.01); *G07F 13/06* (2013.01); *G07F 17/18* (2013.01)

(58) Field of Classification Search
  USPC ....................................................... 700/233
  See application file for complete search history.

(56) References Cited

U.S. PATENT DOCUMENTS

| | | | |
|---|---|---|---|
| 6,437,866 B1 | 8/2002 | Flynn | |
| 6,510,366 B1 | 1/2003 | Murray et al. | |
| 6,516,245 B1 | 2/2003 | Dirksing et al. | |
| 6,603,550 B1 | 8/2003 | Flynn et al. | |
| 6,615,881 B2 | 9/2003 | Bartholomew et al. | |
| 6,622,064 B2 | 9/2003 | Bartholomew et al. | |
| 6,655,551 B2 | 12/2003 | Manne | |
| 6,672,341 B2 | 1/2004 | Bartholomew et al. | |
| 6,715,642 B2 | 4/2004 | Engel et al. | |
| 6,742,549 B1 | 6/2004 | Feygin et al. | |
| 6,779,686 B2 | 8/2004 | Bartholomew et al. | |
| 6,782,307 B2 | 8/2004 | Wilmott et al. | |
| 6,856,861 B2 | 2/2005 | Dirksing et al. | |
| 6,883,561 B2 | 4/2005 | Bartholomew et al. | |
| 6,935,386 B2 | 8/2005 | Miller et al. | |
| 6,986,442 B2 | 1/2006 | Engel et al. | |
| 7,082,970 B2 | 8/2006 | Bartholomew et al. | |
| 7,097,348 B2 | 8/2006 | Miller | |
| 7,099,740 B2 | 8/2006 | Bartholomew et al. | |
| 7,121,429 B2 | 10/2006 | Bartholomew et al. | |
| 7,174,310 B2 | 2/2007 | Bartholomew et al. | |
| 7,198,073 B2 | 4/2007 | Luehrsen et al. | |
| 7,395,134 B2 | 7/2008 | Bartholomew et al. | |
| 7,445,372 B1 | 11/2008 | Engel et al. | |
| 7,475,710 B2 | 1/2009 | Bartholomew et al. | |
| 7,624,769 B2 | 12/2009 | Bartholomew et al. | |
| 7,673,775 B2 | 3/2010 | Penciu | |
| 7,882,504 B2 | 2/2011 | Klingman | |
| 7,971,750 B2 | 7/2011 | Penciu | |
| 8,017,137 B2 | 9/2011 | Bartholomew et al. | |
| 8,141,596 B2 | 3/2012 | Bartholomew et al. | |
| 8,186,872 B2 | 5/2012 | Bartholomew et al. | |
| 8,352,070 B2 | 1/2013 | Bartholomew et al. | |
| 8,393,363 B2 | 3/2013 | Saranow et al. | |
| 8,573,263 B2 | 11/2013 | Bartholomew et al. | |
| 8,608,371 B2 | 12/2013 | Bartholomew et al. | |
| 8,636,173 B2 | 1/2014 | Bartholomew et al. | |
| 8,640,432 B2 | 2/2014 | Rodrigues | |
| 8,830,467 B2 | 9/2014 | Igarashi | |
| 8,880,218 B2 | 11/2014 | Bartholomew et al. | |
| 8,977,389 B2 * | 3/2015 | Witchell | G01F 1/50 700/233 |
| 9,522,112 B2 * | 12/2016 | Dubois | A61K 8/922 |
| 9,623,388 B2 | 4/2017 | Saranow et al. | |
| 9,690,047 B2 | 6/2017 | Zhao | |
| 10,607,269 B2 * | 3/2020 | Balooch | B01F 9/0001 |
| 2002/0082745 A1 * | 6/2002 | Wilmott | A61K 8/732 700/233 |
| 2002/0179639 A1 | 12/2002 | Bartholomew et al. | |
| 2003/0215471 A1 | 11/2003 | Wilmott et al. | |
| 2003/0230355 A1 | 12/2003 | Bartholomew et al. | |
| 2004/0245263 A1 | 12/2004 | Bartholomew et al. | |
| 2005/0021174 A1 | 1/2005 | Wilmott et al. | |
| 2005/0092772 A1 | 5/2005 | Miller et al. | |
| 2013/0338821 A1 * | 12/2013 | Igarashi | B67D 7/08 700/233 |
| 2014/0081462 A1 | 3/2014 | Igarashi | |
| 2015/0021356 A1 | 1/2015 | Witchell et al. | |
| 2015/0107678 A1 * | 4/2015 | Igarashi | G05D 7/0617 137/3 |
| 2015/0173488 A1 | 6/2015 | Witchell et al. | |
| 2015/0202143 A1 | 7/2015 | Dubois et al. | |
| 2015/0314141 A1 | 11/2015 | Choi | |
| 2018/0317633 A1 | 11/2018 | Witchell et al. | |

FOREIGN PATENT DOCUMENTS

| | | |
|---|---|---|
| JP | 2003-291901 | 10/2003 |
| JP | 2003-310350 | 11/2003 |
| JP | 2012-52756 | 3/2012 |
| JP | 2015-531272 | 11/2015 |
| KR | 10-2006-0109797 A | 10/2006 |
| KR | 10-2009-0113940 A | 11/2009 |
| KR | 10-2011-0134722 A | 12/2011 |
| KR | 10-1490987 B1 | 2/2015 |
| KR | 10-2015-0056828 | 5/2015 |
| WO | WO 02/069215 A1 | 9/2002 |
| WO | WO 2014/043018 A1 | 3/2014 |

OTHER PUBLICATIONS

International Search Report and Written Opinion dated Mar. 15, 2017 in PCT/US2016/064091.
Extended European Search Report dated Apr. 8, 2019 in Patent Application No. 16871380.8, citing documents CL-CN therein, 6 pages.
Office Action dated Jun. 25, 2019 in Japanese Application No. 2018-527922.
Office Action dated Aug. 20, 2019 in Korean Application No. 10-2018-7018502 (w/English translation).
Japanese Office Action dated Apr. 7, 2020, in Patent Application No. 2016-527922, 3 pages.
Korean Office Action dated May 8, 2020, in Patent Application No. 10-2018-7018502, citing documents AA and AO-AR therein, 15 pages (with unedited computer generated English translation).
Korean Office Action dated Nov. 11, 2020 in Korea Patent Application No. 10-2018-7018502 (with English language translation), 15 pages.
Chinese Office Action dated Feb. 9, 2021 in Chinese Patent Application No. 201680070585.1, 3 pages.
European Office Action dated Apr. 29. 2021 in European Patent Application No. 16871380.8, 5 pages.
Japanese Office Action dated Jun. 1, 2021 in Japanese Patent Application No. 2018-527922, citing documents AA and AO therein, 10 pages.

* cited by examiner

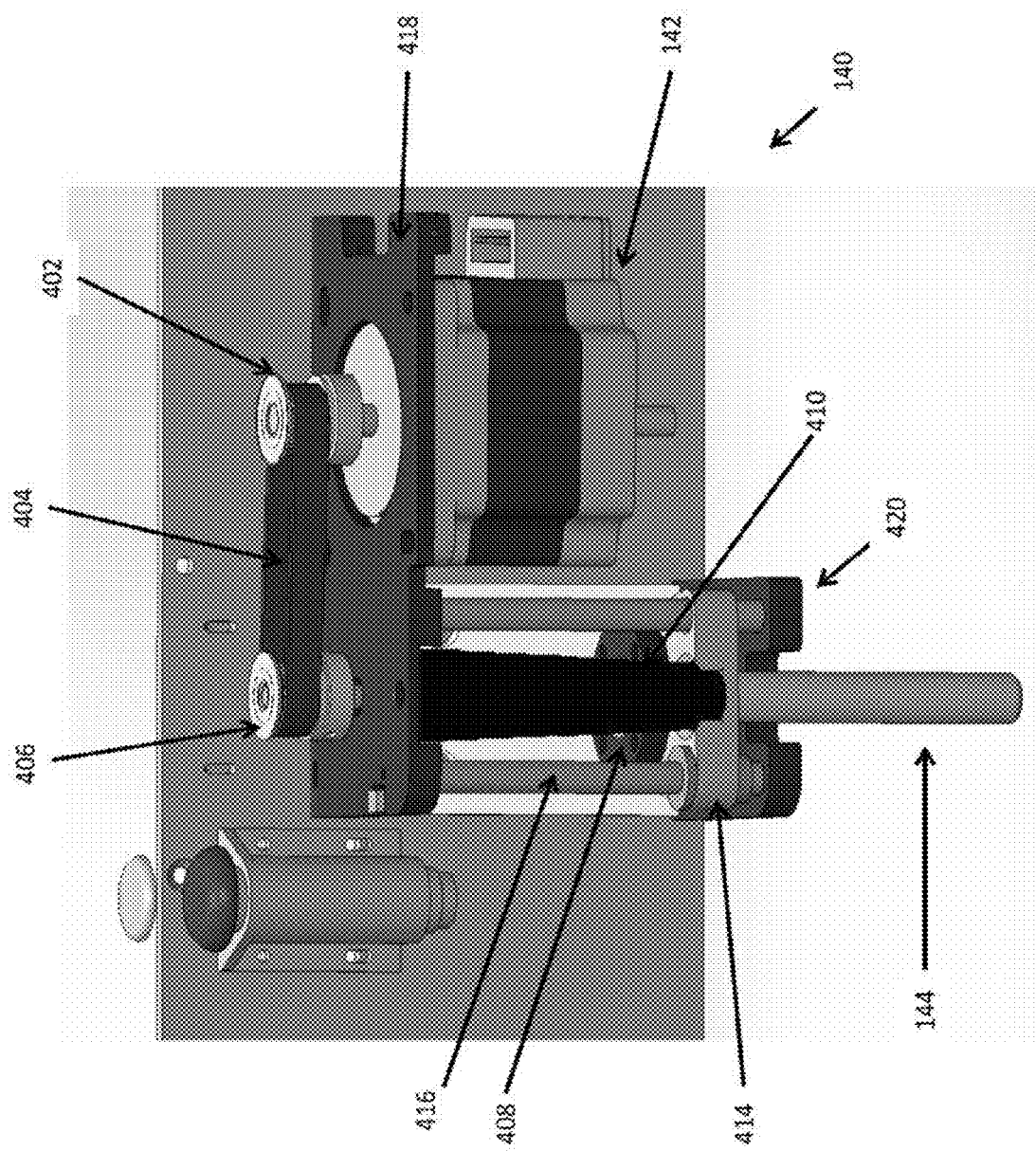

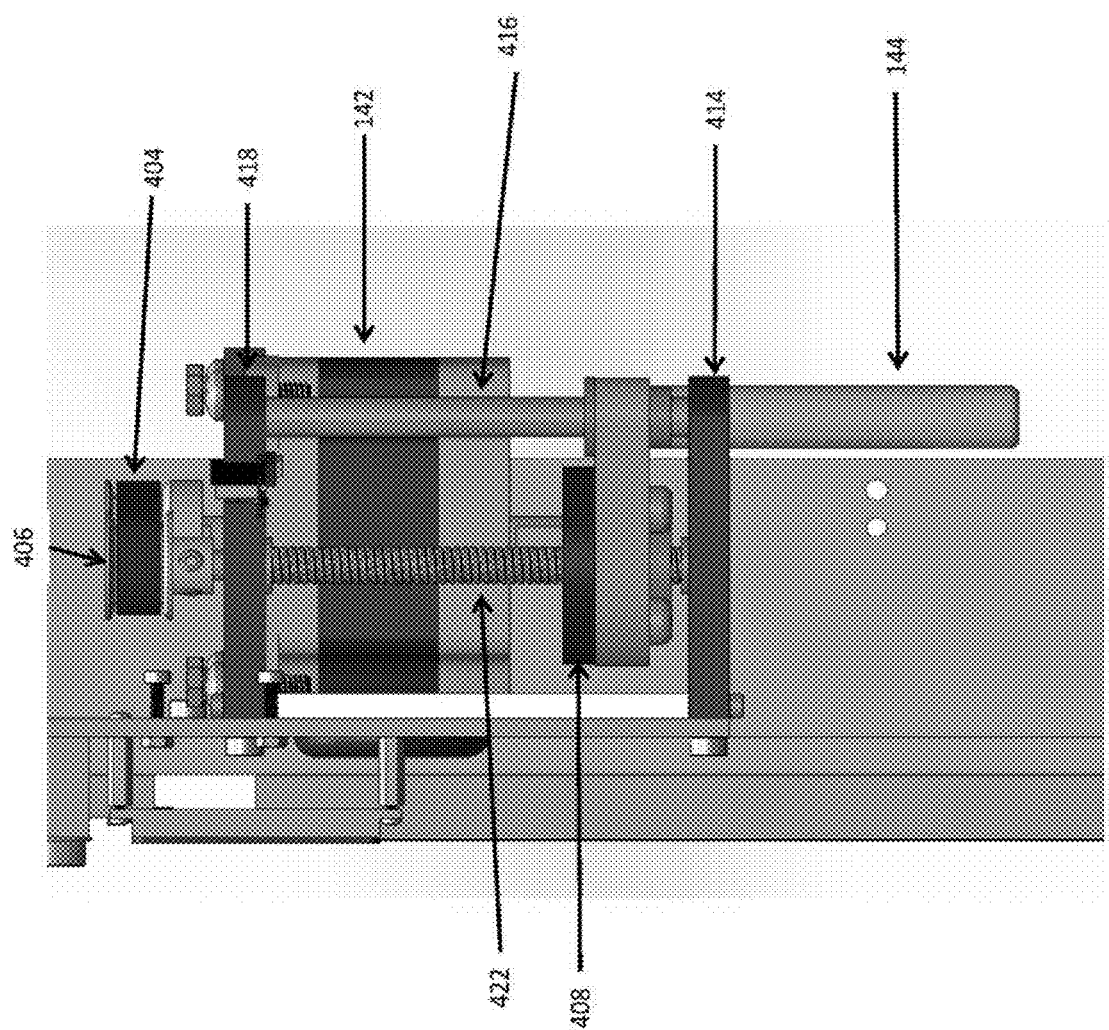

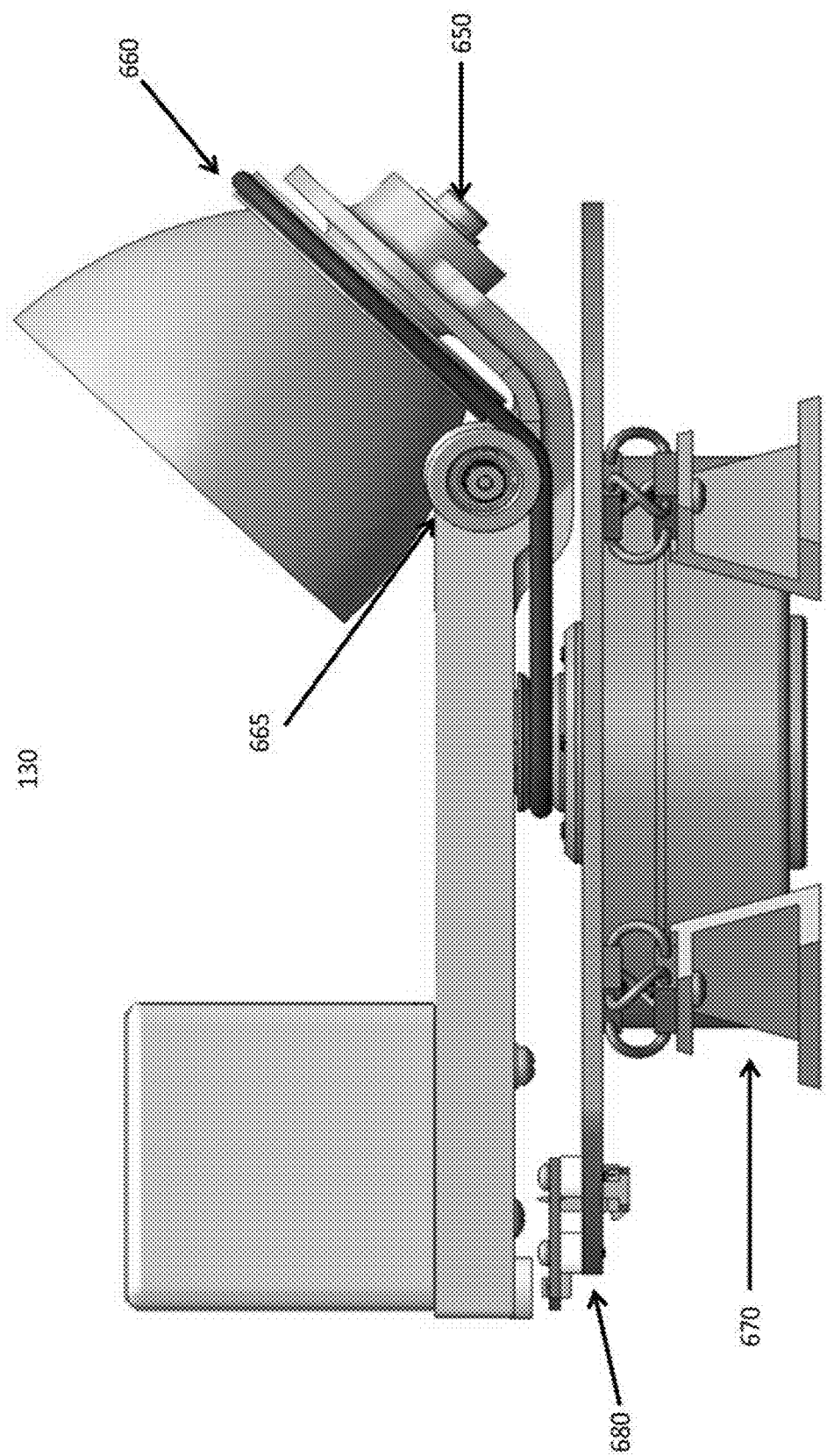

| Rules | | | | | |
|---|---|---|---|---|---|
| 9% dosage total Boosters + 1% dosage fragrance = 10% Boosters Combo | 1 top priority | 3*3% THREE shots of the SAME booster | | | |
| | 2 top priorities | Case A 2 EQUIVALENT severity | Case B: one HIGHER severity | | |
| | | 3% Booster + 3% Booster + 3%Base | 2*3% of higher sev + 3% other booster | | |
| | 3 top priorities | 3*3% (ONE shot of 3 boosters) | | | |
| | Perfume | 1% of Booster if YES | | | |

Fig. 19

SYSTEM FOR DETERMINING, DISPENSING, AND MIXING BLENDED COMPOSITION FOR SKIN TREATMENT

CROSS-REFERENCE TO RELATED APPLICATIONS

This application is a continuation of and claims the benefit of priority under 35 U.S.C. § 120 from U.S. application Ser. No. 14/956,133 filed Dec. 1, 2015, the entire contents of which are incorporated herein by reference.

BACKGROUND

Field

The disclosure herein generally relates to a system, apparatus, and method for determining a combination of booster compositions and base compositions which can be blended and dispensed for a particular user to address a particular skin concern.

SUMMARY

According to an embodiment, a system is provided for providing a cosmetic composition to a user. The system includes an apparatus configured to dispense at least one cosmetic composition into a output container; a user interface configured to receive information about the user; and circuitry configured to receive the information about the user and determine one or more cosmetic compositions to be dispensed into the output container based on the information about the user received at the user interface.

According to an embodiment, the information about the user is information regarding the skin of the user.

According to an embodiment, the apparatus is configured to hold a plurality of cartridges which contain a respective plurality of cosmetic compositions, and the circuitry is configured to receive information regarding the current plurality of cosmetic compositions contained in the apparatus.

According to an embodiment, the circuitry is configured to compare the information regarding the current plurality of cosmetic compositions contained in the apparatus to one or more cosmetic compositions required to be dispensed into the output container based on the information about the user, and to output information regarding any of the current plurality of cosmetic compositions contained in the apparatus which need to be removed from the apparatus, and any of the one or more cosmetic compositions required to be dispensed into the output container which need to be inserted into the apparatus.

According to an embodiment, the information regarding the current plurality of cosmetic compositions contained in the apparatus includes at least one of volume and expiration date information, and the circuitry is configured to output information regarding any of the current plurality of cosmetic compositions contained in the apparatus which need to be removed or replaced based on the volume or expiration date information.

According to an embodiment, the system further includes a printer, wherein the circuitry is configured to control the printer to print a label describing at least one of an identifier of the user and the contents of the output container after the one or more cosmetic compositions are dispensed into the output container.

According to an embodiment, the user interface is implemented by a portable wireless device that communicates wirelessly with the apparatus.

According to an embodiment, the circuitry is configured to control storage data regarding the contents of the output container after the one or more cosmetic compositions are dispensed into the output container in association with information about the user at a memory located externally to the apparatus and the user interface device.

According to an embodiment, the circuitry is configured to control transmission of an electronic message to a destination address corresponding to the user after the one or more cosmetic compositions are dispensed into the output container.

According to an embodiment, a method implemented by a system is provided for providing a cosmetic composition to a user, the system including an apparatus for dispensing at least one cosmetic composition into a output container, a user interface, and circuitry. The method includes receiving, at the user interface, information about the user; determining, by the circuitry, one or more cosmetic compositions to be dispensed into the output container based on the information about the user received at the user interface.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the disclosure and many of the attendant advantages thereof will be readily obtained as the same becomes better understood by reference to the following detailed description when considered in connection with the accompanying drawings, wherein:

FIGS. 4A and 4B respectively show a front view and a side view of a dispenser in the blend apparatus according to an embodiment.

FIGS. 6A and 6B show a detailed view of the mixer 130 according to an embodiment.

FIG. 19 shows an example of a set of rules used to determine the specific recipe according to an embodiment.

Like reference numerals designate identical or corresponding parts throughout the several views.

DETAILED DESCRIPTION

FIG. 1 shows a blend apparatus 100 for dispensing and mixing a cosmetic composition according to an embodiment.

Figure 1A:
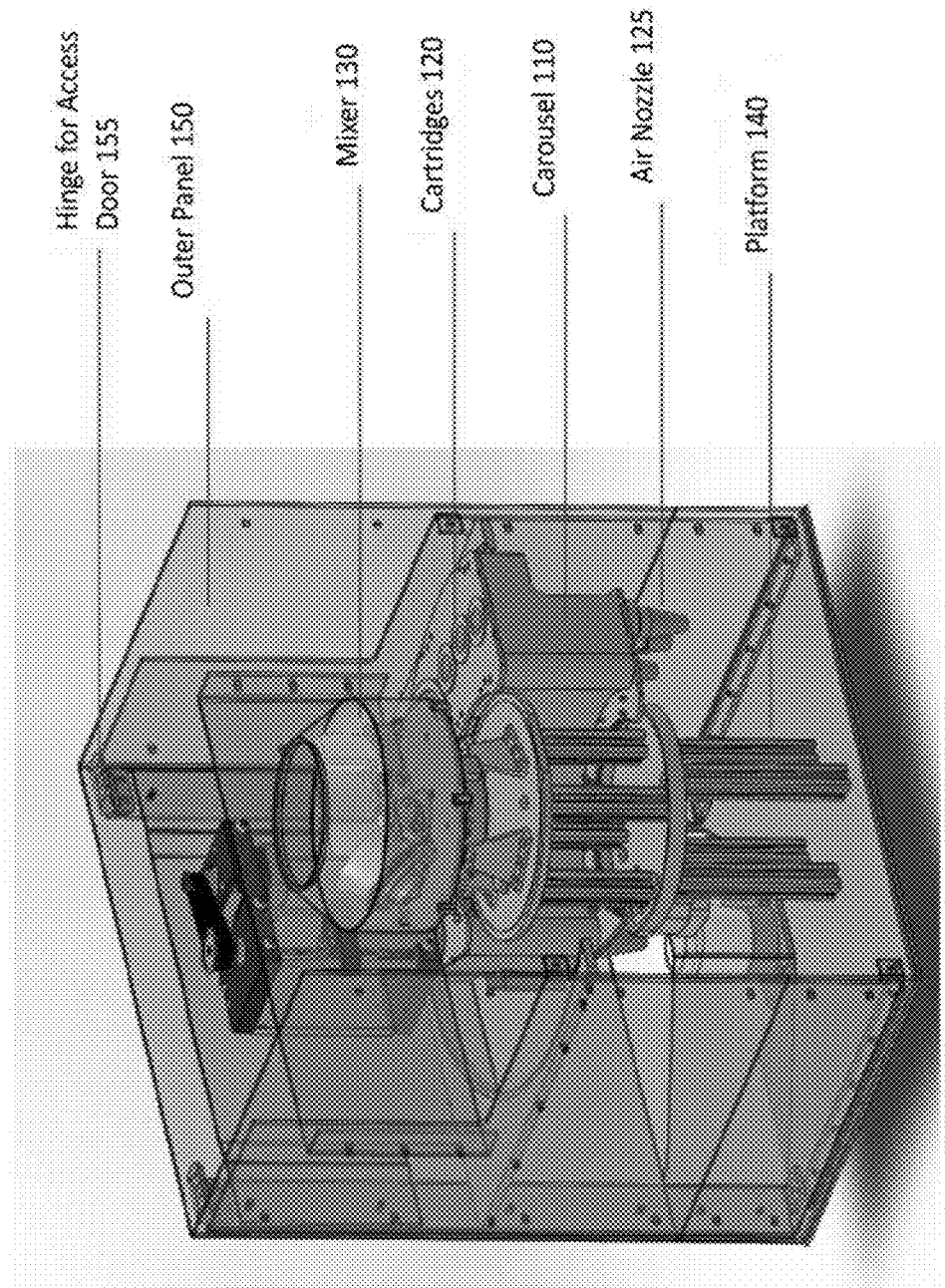
FIGS. 1A, 1B, and 1C illustrate different views of a blend apparatus according to an embodiment.

As shown in FIG. 1A of a rear view of the blend apparatus 100, the apparatus includes a carousel 110 that acts as a cartridge holder for holding cartridges 120. The apparatus further includes a mixer 130 that is disposed on a platform 140. The platform 140 is disposed such that the carousel 110 is rotatable around a circumference of the platform 140. The apparatus further includes a housing that includes outer panels 150, and a top panel (not shown) acts as an access door that opens and closes using hinge 155.

Figure 1B:
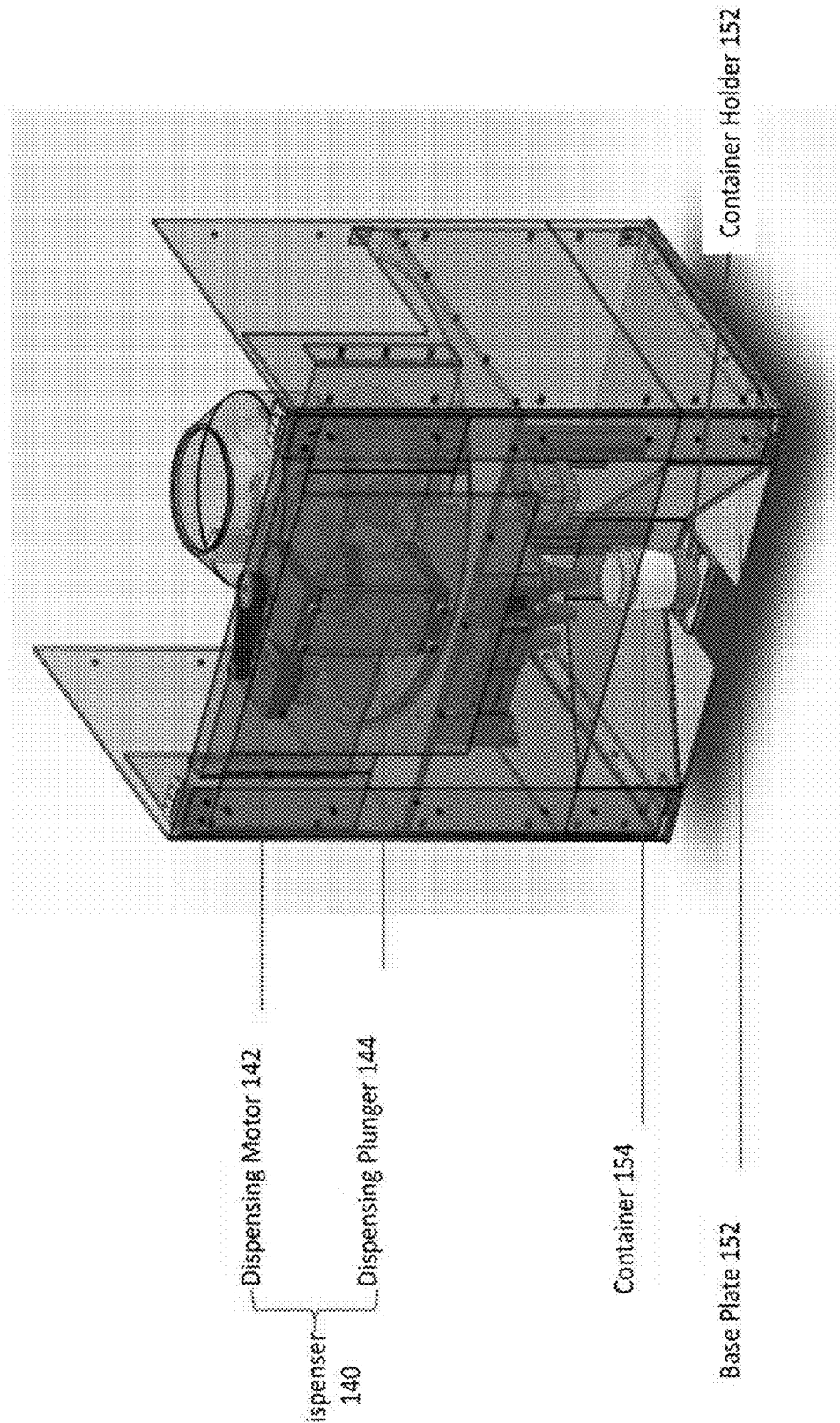

FIG. 1B shows a front view of the apparatus 100, and shows that the apparatus 100 further includes a dispenser 140. The dispenser 140 includes a dispensing motor 142 and a dispensing plunger 144. The apparatus further includes a container receiving area 150 disposed below the dispenser 140, which includes a base plate 152 and a container holder 152 for holding the container 154.

Figure 1C:
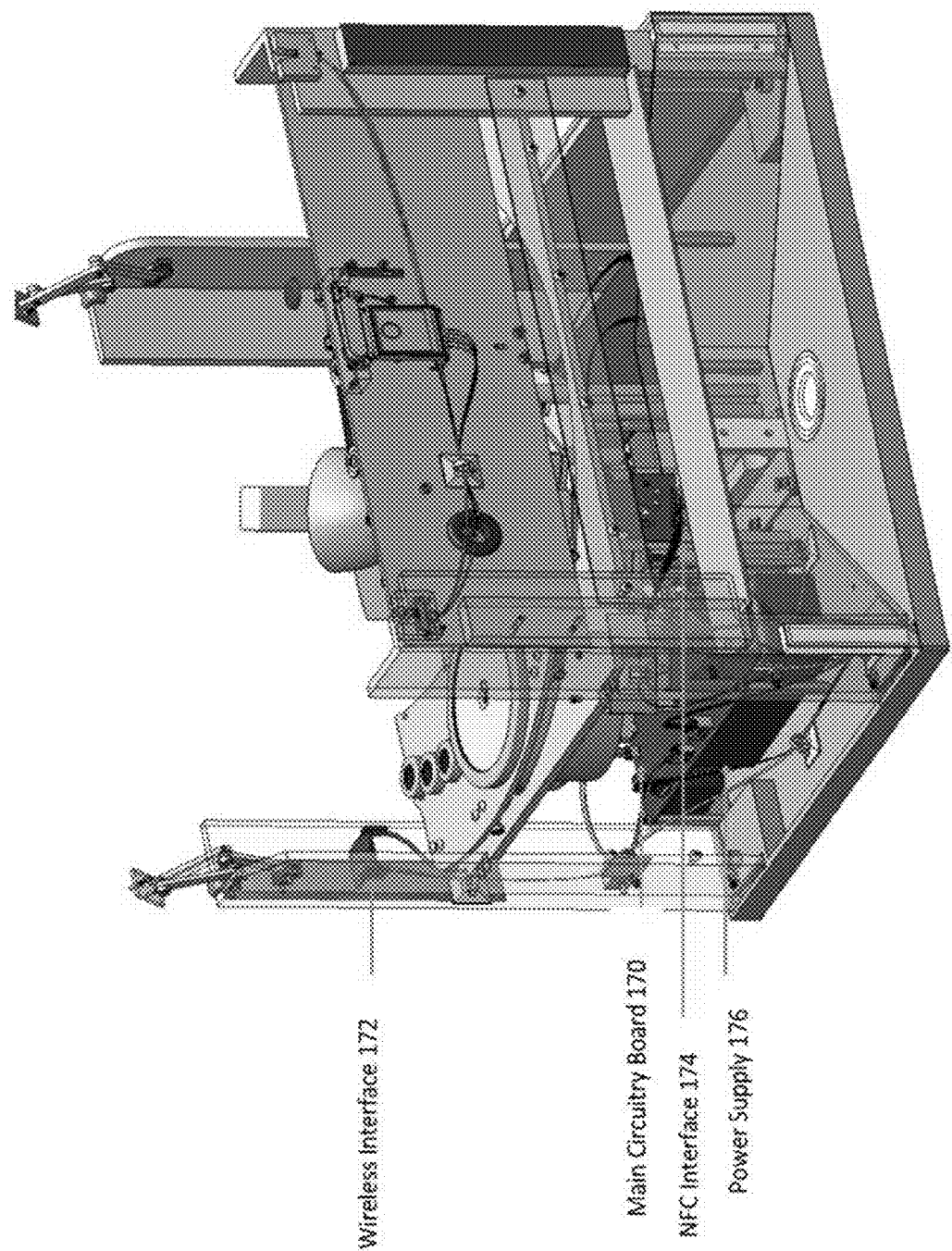

FIG. 1C shows additional details of the apparatus 100, such as a main circuitry board 170, a wireless interface 172, a Near Field Communication (NFC) interface 174, and a Power Supply 176. In a non-limiting example, the wireless interface 172 may be a Bluetooth interface, but it may also be a different type of wireless interface as understood to a person of ordinary skill in the art.

Figure 2B:
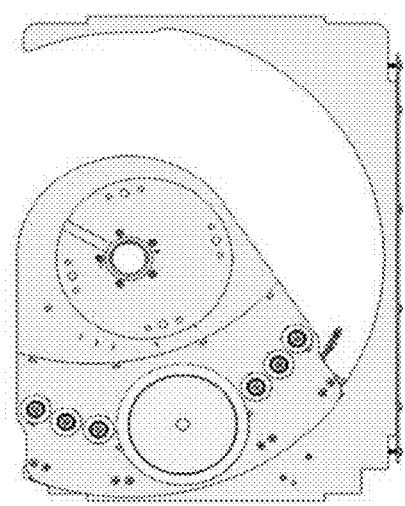
FIGS. 2A-2D show detailed views of a carousel in the blend apparatus according to an embodiment.
Figure 2A:
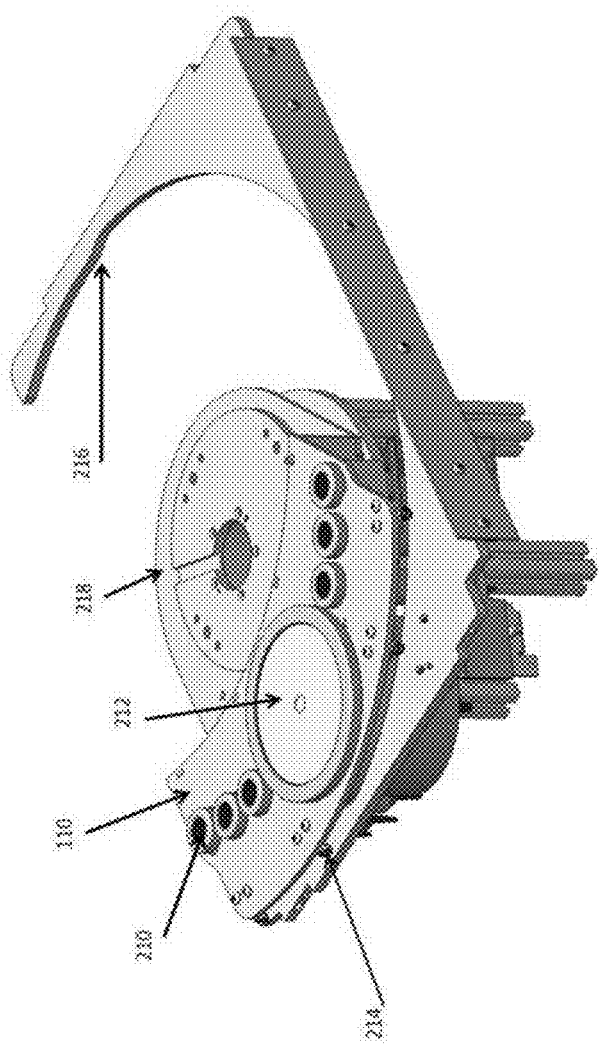

FIGS. 2A-2D show detailed views of the carousel 110. As shown in FIG. 2A, the carousel includes different slots 210 and 212 for receiving the cartridges. The slots 210 are sized to receive the cartridges which hold a booster composition. The slot 212 is sized to receive a cartridge that holds a base composition, such as a serum base or a cream base. It can be seen that the slot 212 is larger than slot 210 since the cartridge for the base composition is set to be larger than the cartridge for the booster composition in view of the increased volume and frequency of use for the base composition. FIG. 2A further shows that the carousel includes wheels 214 which are configured to move along a track defined by circular edge 216. Additionally, a center portion 218 attaches the interior section of the carousel 110 to a motor shown on FIG. 2B.

FIG. 2B shows the carousel motor 220 which operates to rotate a transmitting gear 222, which in turn moves a receiving gear 224 that is attached to the center portion 218 of the carousel.

Figure 2C:
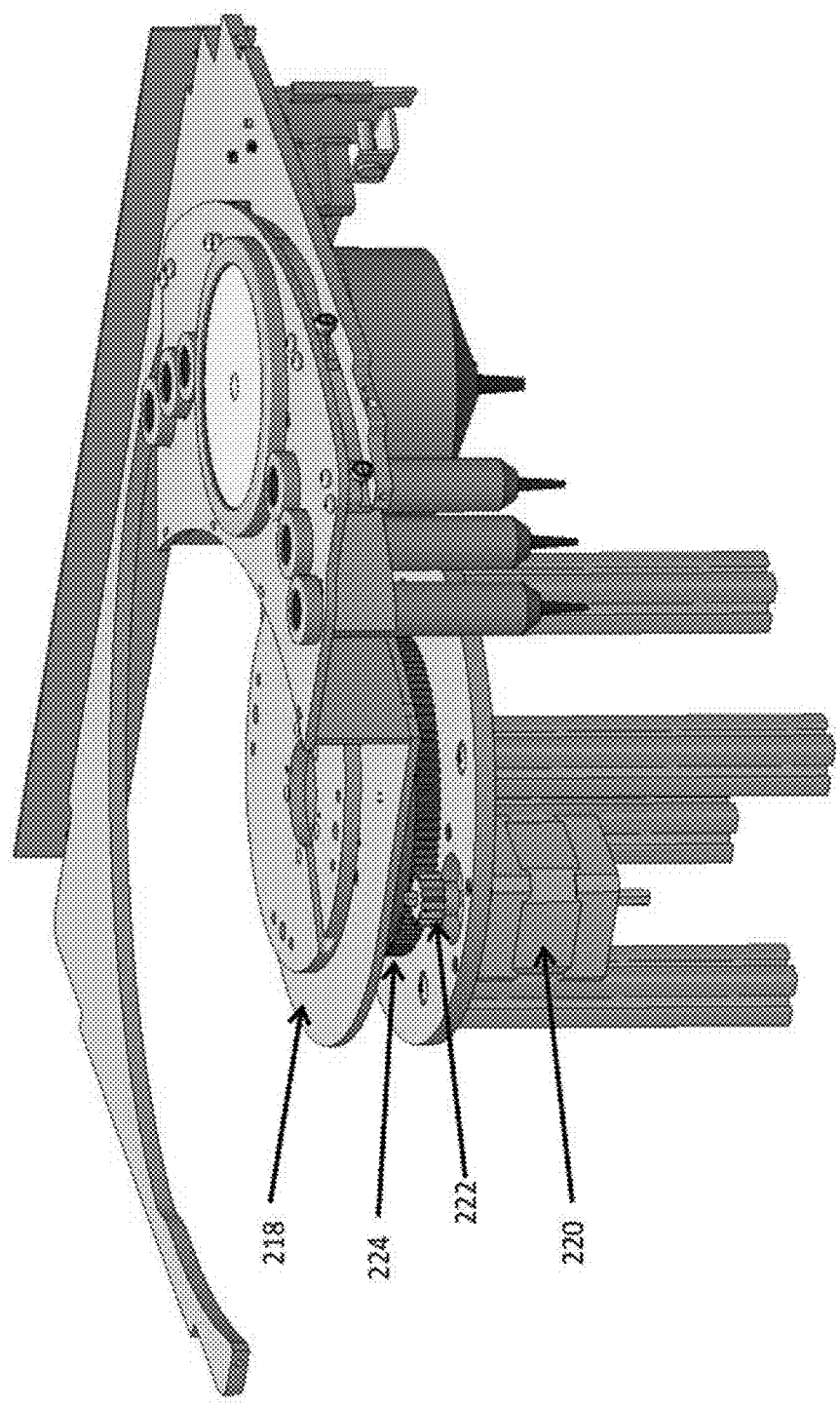
Figure 2D:
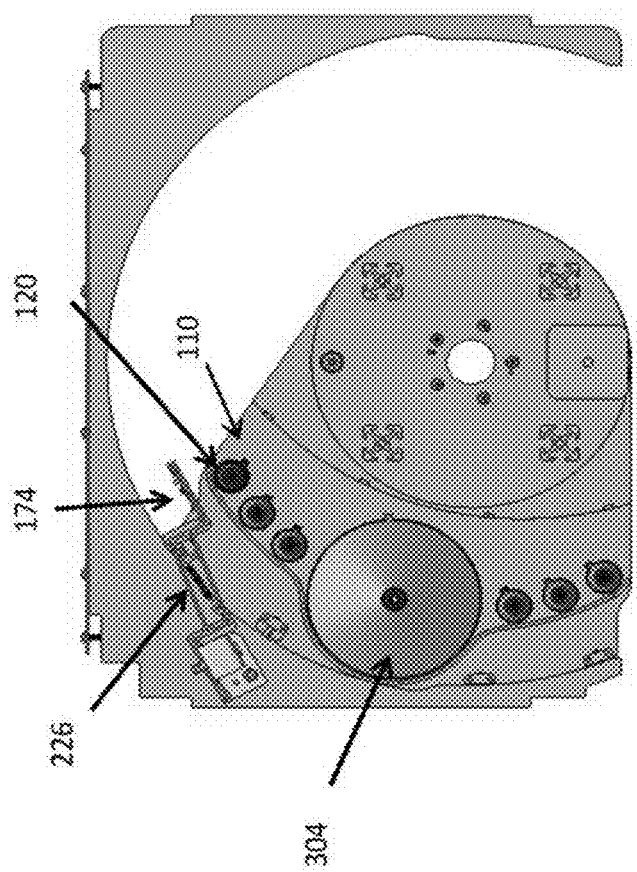

FIG. 2C shows a bottom view of the carousel 110. FIG. 2C shows a position of the NFC interface with respect to the cartridge 120 which is in a booster slot. The NFC interface is positioned to be very close to the cartridge since NFC interface has a maximum communication distance of 4 cm on average. To account for the extra size of the base cartridge 304 (shown in FIG. 3B), the NFC interface is attached to a spring-biased attachment arm 226 which allows the NFC to flexibly adjust position when the carousel moves and the NFC interface is contacted by the base cartridge 304. With this configuration, the NFC interface will remain close to either a booster cartridge or a base cartridge that is positioned adjacent to the NFC interface regardless of the size difference of the cartridges.

Figure 3B:
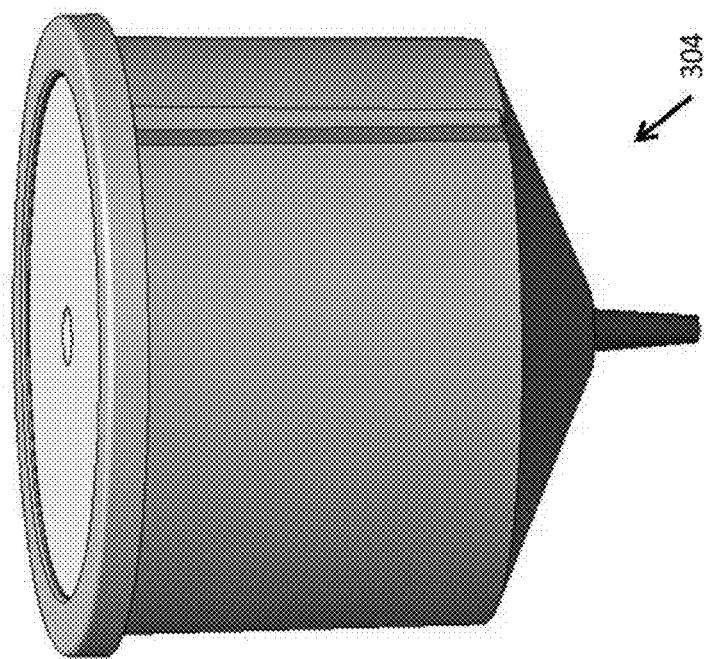
FIGS. 3A and 3B show detailed views of an exemplary cartridge according to an embodiment.
Figure 3A:
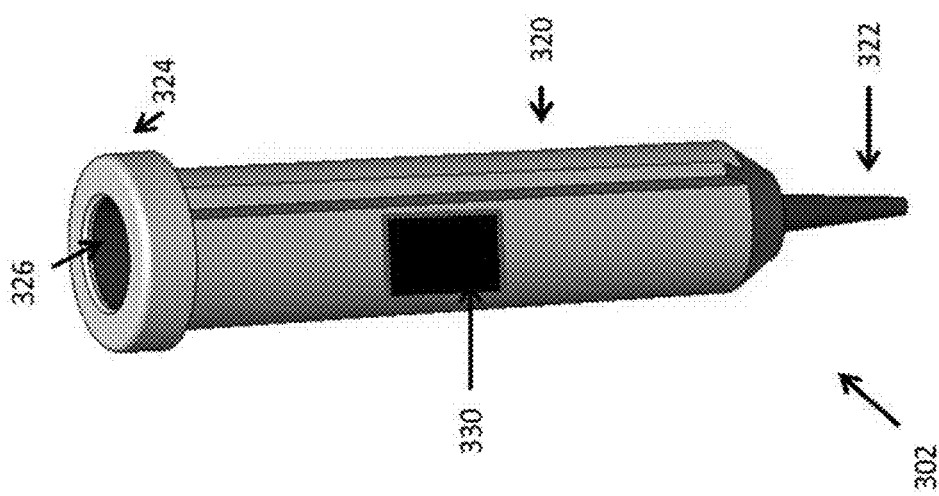

FIGS. 3A and 3B show detailed views of an exemplary cartridge that is disposed in the receiving area 210 or 212 of the carousel 110. FIG. 3A shows a booster cartridge 302 which includes a body portion 320, an air nozzle 322, and a top cover 324 which includes a movable disk 326 which is configured to move down the shaft of the body portion 320 when depressed by the dispensing plunger 144. FIG. 3B shows a base cartridge 304, which has similar components as the booster cartridge 302 but with a larger width for handling a larger volume.

Each cartridge has an NFC tag 330 that is initialized when the cartridge is filled. In one example, the NFC tag is adhered to a syringe within the cartridge. The cartridge is actually composed of a sheath that covers this syringe to hide visually the NFC tag and ensure it's well orientated. Every time the access panel of the apparatus 100 is opened and then closed, a scan is performed on each of the NFC tags of any cartridges inserted into the slots 210 or 212. After the NFC interface runs the scan, the apparatus will then learn for each cartridge:

Ingredient id
Lot number of ingredient
Expiration date
Volume

Additionally, after the dispensing operation is performed, the volume will be updated by WRITING on the NFC a new volume (based on subtracting the volume dispensed from the old volume).

FIGS. 4A and 4B respectively show a front view and a side view of the dispenser 140, which includes the dispensing motor 142 and dispensing plunger 144. The dispensing motor 144 receives a signal from the CPU when the carousel moves a cartridge into the dispensing region. The dispensing motor activates to rotate transmitting spindle 402 which causes rotation of receiving spindle 406 through coupling by transfer belt 404. Rotation of spindle 406 moves disk 408 (shown behind the telescoping portion 410) downward since the disk 408 is attached to the spindle 406 by a screw and thread mechanism 422 (see FIG. 4B). The disk 408 is attached to a moving platform 414 which is designed to move up and down shafts 416 as disk 408 is moved up and down. The shafts are attached to a fixed platform 420. In the foreground of FIG. 4A, a telescoping portion 410 and the plunger 144 is attached to each side of the platform 414 of the dispenser 140. The top portion of the telescoping portion 410 is attached to the fixed platform 418 which also supports the motor 142. When the moving platform 414 is moved up and down as described above, the plunger 144 is moved up and down and the telescoping portion 410 contracts or expands accordingly.

Figure 5:
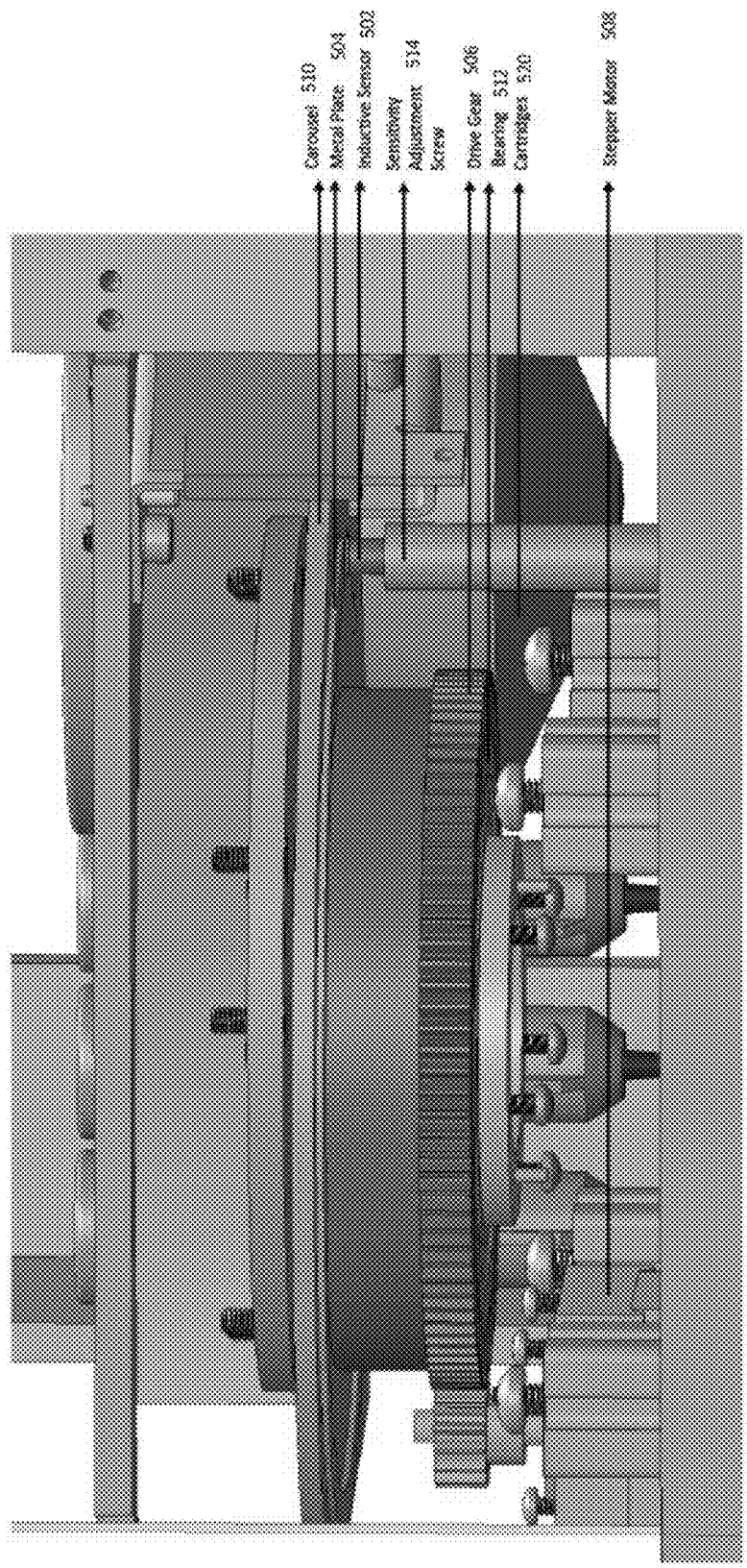
FIG. 5 shows a view of the blend apparatus that includes a sensor that senses a cartridge position according to an embodiment.

In one example, one of the cartridges 520 is detected to be moved into a proper position beneath the dispenser 140 by using a sensor 502 shown in FIG. 5. The sensor 502 may be an inductive sensor which detects a variation in the metal plate 504, which is a thin, metal strip beneath the carousel as shown in FIG. 5. The variation in the metal plate 504 may be a hole in the metal plate.

In one example, the inductive sensor on the carousel 510 only detects an original position of the carousel (the "HOME" position), and the motor step count on the drive gear 506, driven by the motor 508 and moving around a bearing 512, is reliable and repeatable enough to precisely move to booster/base positions from the HOME position. In another example, there is a variation, or hole, in the metal plate representing when each booster or base has moved into the dispensing area or at a point of detection of the NFC interface. A sensitivity of the sensor 502 may be adjusted by sensitivity adjustment screw 514.

The CPU is configured to detect when a target volume is reached with a closed loop using a load cell. The load cell (not shown) is disposed under the container holder 152. The load cell measures the actual volume dispensed by weighing the container holder being filled and causes a signal to be transmitted to the dispensing motor to cause the plunger to retract as soon as volume is reached. Additionally, the plunger will travel quickly down until it reaches the cartridge then slow down because there is a sensor (not shown) on the plunger able to detect a metal ring placed on the cartridge.

Figure 6A:
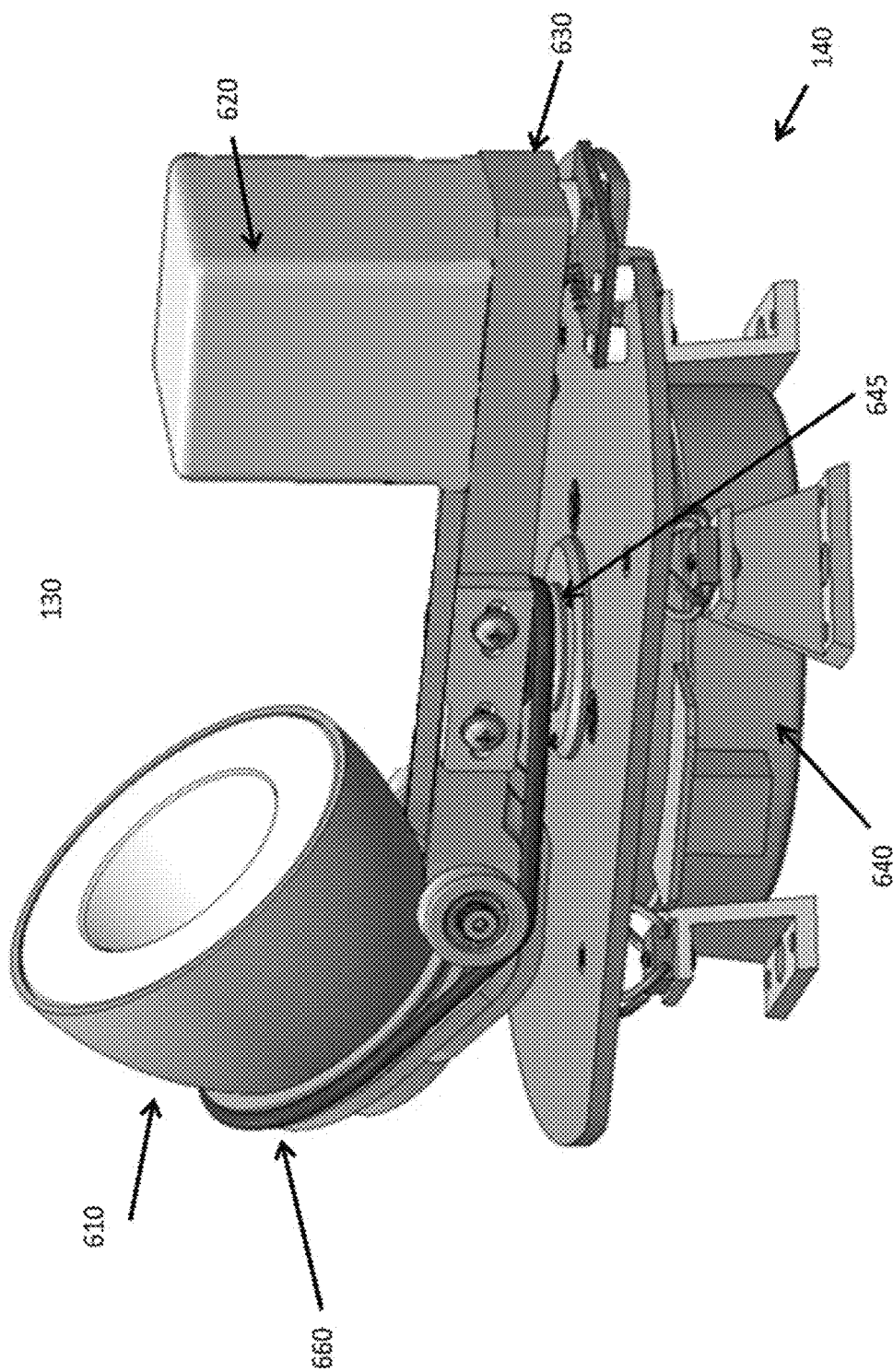

FIGS. 6A and 6B show a detailed view of the mixer 130 serving to mix the booster composition(s) and base composition located in a container, comprising a mixing side where a carrier 610 holds the container and a balancing side which includes a counterweight 620. A rotating carrier 630 extends across the balancing side A and the mixing side M. A drive motor 640 serves to drive the carrier 630 via a drive shaft 645.

On the mixing side, the carrier 610 is a rotating carrier which is driven by way of a drive shaft 650 shown in FIG. 6B to rotate the container along an axis that is disposed at an angle with respect to the angle of rotation of the rotating carrier 630. FIGS. 6A and 6B show that a belt 660 couples the rotation by the driver motor 640 to drive the carrier 610 at the above-mentioned angle with the assistance of the pulley mechanism 665. Therefore, a separate motor is not required to rotate the carrier 610 along the drive shaft 650.

The mixer is attached to the platform 140 by connectors 670 and platform 680.

Figure 7:
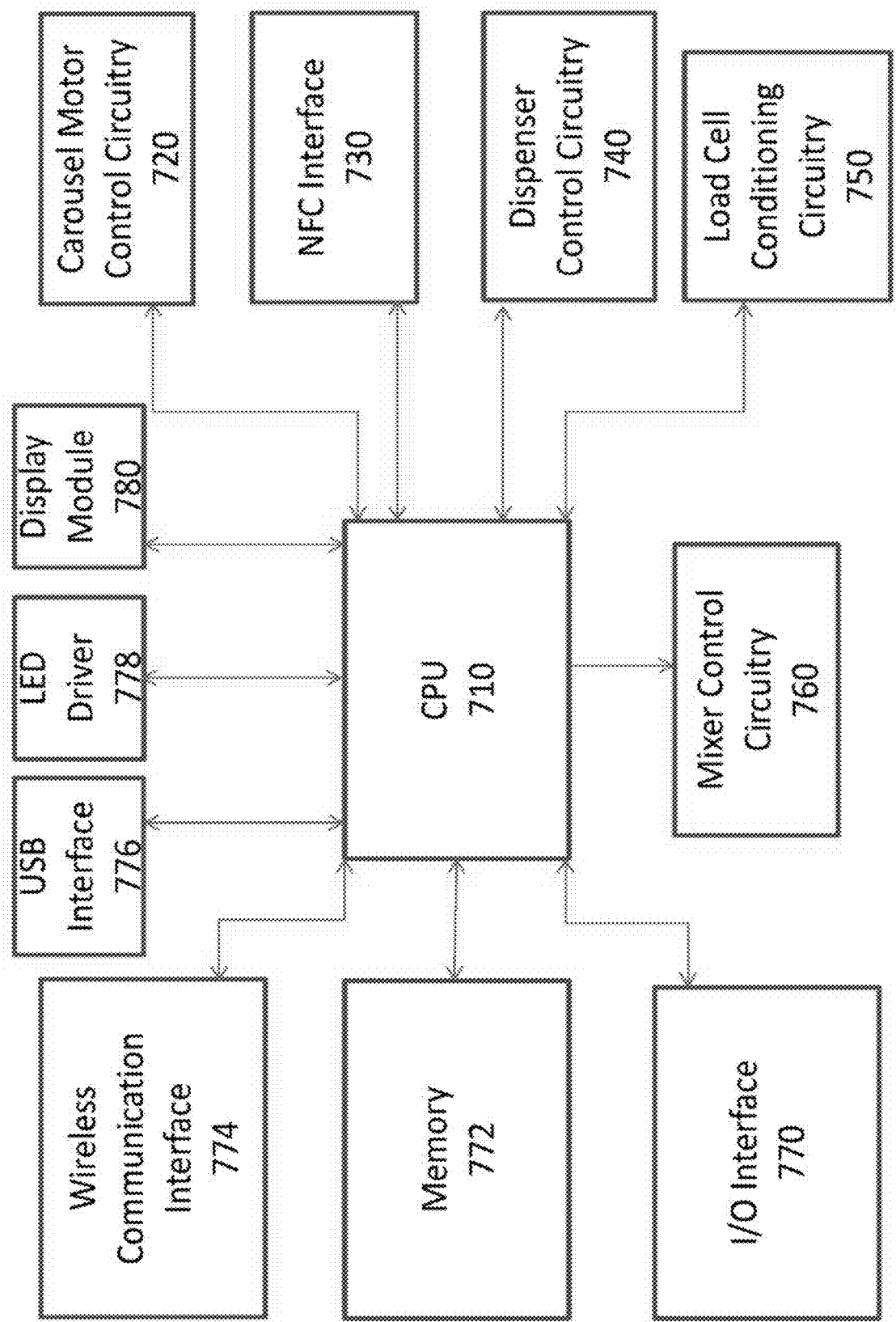
FIG. 7 shows a block diagram of the hardware included in the apparatus according to an embodiment.

FIG. 7 shows a block diagram of the hardware included in the apparatus. A central processing unit (CPU) 710 provides primary control over the separate circuitry components included in the apparatus, such as the carousel motor control circuitry 720, the NFC Interface 730, the dispenser control circuitry 740 (which includes the dispensing motor control circuitry and the inductive sensor circuitry), the load cell conditioning circuitry 750, the mixer control circuitry 760. The CPU 710 also controls an optional input/output device (such as a keyboard or mouse), a memory 780, the wireless communication interface circuitry 774, a universal serial bus (USB) controller 776, a LED driver 778, and a display module 780. The LED driver controls the pulsing of one or more LEDs that illuminate the container holder 152.

In an embodiment, circuitry includes, among other things, one or more computing devices such as a processor (e.g., a microprocessor, a quantum processor, qubit processor, etc.), a central processing unit (CPU), a digital signal processor (DSP), an application-specific integrated circuit (ASIC), a field programmable gate array (FPGA), or the like, or any combinations thereof, and can include discrete digital or analog circuit elements or electronics, or combinations thereof. In an embodiment, a module includes one or more ASICs having a plurality of predefined logic components. In an embodiment, a module includes one or more FPGAs, each having a plurality of programmable logic components.

In an embodiment, circuitry includes one or more components operably coupled (e.g., communicatively, electromagnetically, magnetically, ultrasonically, optically, inductively, electrically, capacitively coupled, wirelessly coupled, or the like) to each other. In an embodiment, circuitry includes one or more remotely located components. In an embodiment, remotely located components are operably coupled, for example, via wireless communication. In an embodiment, remotely located components are operably coupled, for example, via one or more communication modules, receivers, transmitters, transceivers, or the like.

In an embodiment, any of the CPU 710 or other components shown in FIG. 7 may be substituted with alternative circuitry elements. Examples of circuitry includes memory that, for example, stores instructions or information. Non-limiting examples of memory include volatile memory (e.g., Random Access Memory (RAM), Dynamic Random Access Memory (DRAM), or the like), non-volatile memory (e.g., Read-Only Memory (ROM), Electrically Erasable Programmable Read-Only Memory (EEPROM), Compact Disc Read-Only Memory (CD-ROM), or the like), persistent memory, or the like. Further non-limiting examples of memory include Erasable Programmable Read-Only Memory (EPROM), flash memory, or the like. In an embodiment, memory is coupled to, for example, one or more computing devices by one or more instructions, information, or power buses.

In an embodiment, circuitry includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device. In an embodiment, a module includes one or more user input/output components that are operably coupled to at least one computing device configured to control (electrical, electromechanical, software-implemented, firmware-implemented, or other control, or combinations thereof) at least one parameter associated with, for example, determining one or more tissue thermal properties responsive to detected shifts in turn-ON voltage.

In an embodiment, circuitry includes a computer-readable media drive or memory slot that is configured to accept signal-bearing medium (e.g., computer-readable memory media, computer-readable recording media, or the like). In an embodiment, a program for causing a system to execute any of the disclosed methods can be stored on, for example, a computer-readable recording medium, a signal-bearing medium, or the like. Non-limiting examples of signal-bearing media include a recordable type medium such as a magnetic tape, floppy disk, a hard disk drive, a Compact Disc (CD), a Digital Video Disk (DVD), Blu-Ray Disc, a digital tape, a computer memory, or the like, as well as transmission type medium such as a digital or an analog communication medium (e.g., a fiber optic cable, a waveguide, a wired communications link, a wireless communication link (e.g., receiver, transmitter, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

In an embodiment, circuitry includes acoustic transducers, electroacoustic transducers, electrochemical transducers, electromagnetic transducers, electromechanical transducers, electrostatic transducers, photoelectric transducers, radioacoustic transducers, thermoelectric transducers, or ultrasonic transducers.

In an embodiment, circuitry includes electrical circuitry operably coupled with a transducer (e.g., an actuator, a motor, a piezoelectric crystal, a Micro Electro Mechanical System (MEMS), etc.) In an embodiment, circuitry includes electrical circuitry having at least one discrete electrical circuit, electrical circuitry having at least one integrated circuit, or electrical circuitry having at least one application specific integrated circuit. In an embodiment, circuitry includes electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs.

Figure 8:
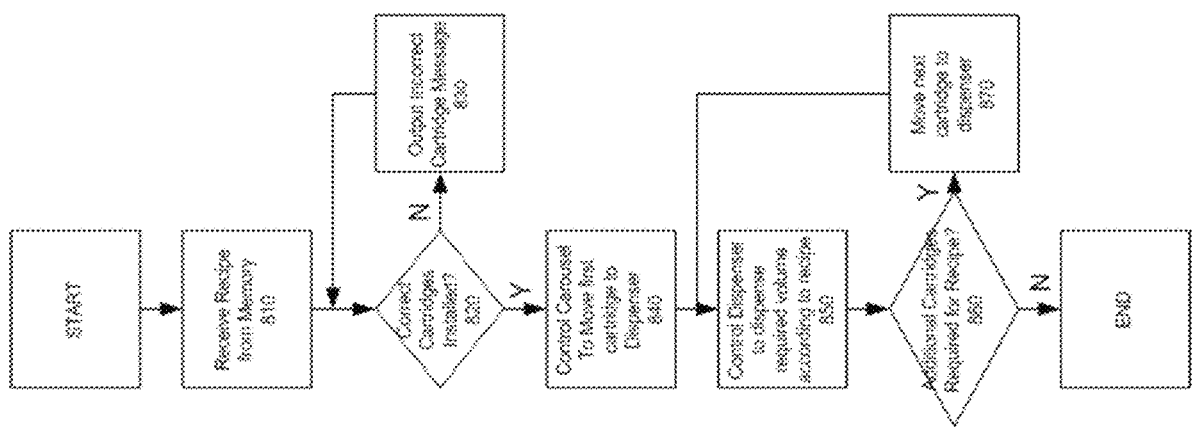
FIG. 8 shows a flowchart of a process or algorithm performed by the blend apparatus according to an embodiment.

FIG. 8 shows a flowchart of a process or algorithm controlled by the circuitry of the blend apparatus 100. After the start of the process, at step 810, a recipe is received from memory. At step 820, the circuitry determines if the correct cartridges are installed. If the correct cartridges are inserted, the process moves to step 840, otherwise at step 830 the apparatus outputs a message to the user indicating that the correct cartridges need to be inserted. At step 840, the carousel is controlled to move the first cartridge in the recipe to the dispenser. In step 850, the dispenser is controlled to dispense the required volume of the composition in the cartridge according to the recipe. At step 860, the circuitry determines if additional cartridges are required for the recipe. If the determination is "Yes" at 860, then the at step 870, the process proceeds with moving the next cartridge in the recipe to the dispenser and the process proceeds from step 850. If "No" at step 860, the process ends.

Figure 9:
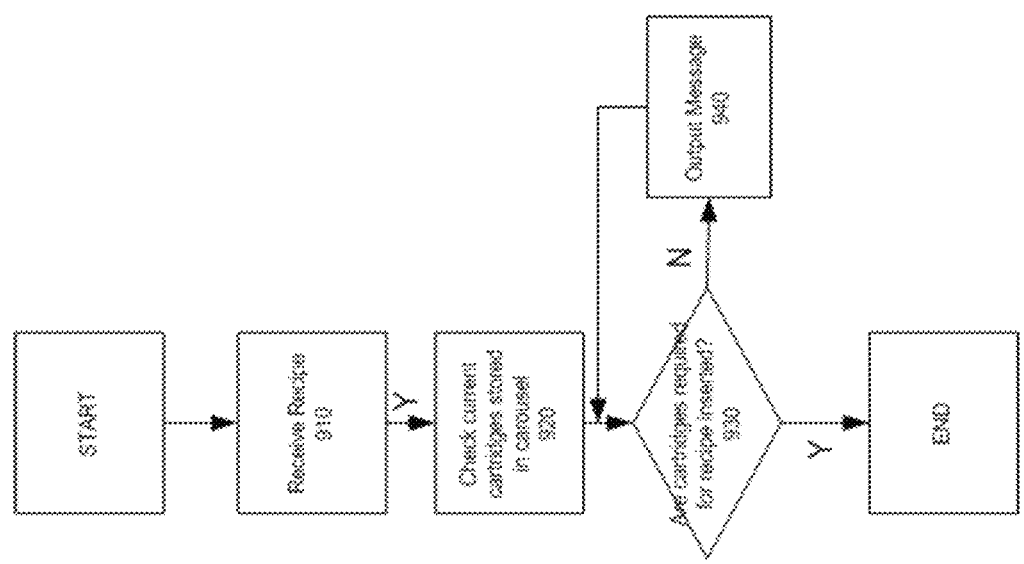
FIG. 9 shows an example of a sub-process or algorithm for determining a current set of booster or base compositions in the blend apparatus according to an embodiment.

FIG. 9 shows an example of a sub-process or algorithm performed by the circuitry of the apparatus 100 for determining a current set of booster or base compositions in the apparatus 100. At step 910, a recipe is received from memory. At step 920, the circuitry checks the current cartridges stored in the carousel. At step 930, the circuitry determines if the current cartridges stored in the carousel include all of the cartridges required for the received recipe.

If this determination is "No" then a message is outputted to the user at step 940 to request the user to insert the required cartridges. If the determination is "Yes" then the sub-process ends, and the circuitry will proceed with a process of moving the cartridges to the dispenser.

Figure 10:
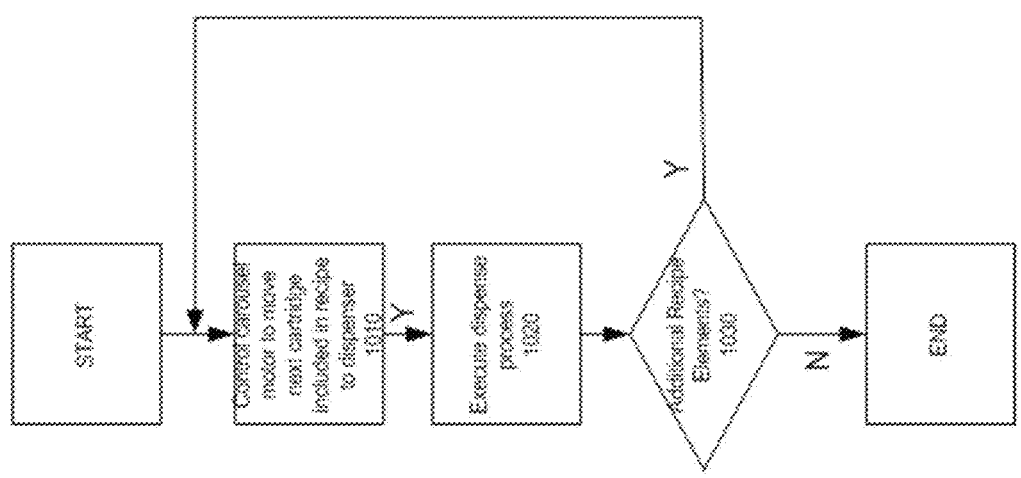
FIG. 10 shows an example of a process or algorithm for controlling the carousel to move the cartridges to the dispenser according to an embodiment.

FIG. 10 shows an example of a process or algorithm performed by the circuitry of the apparatus 100 for controlling the carousel to move the cartridges to the dispenser as a sub-process of the overall method. At step 1010, the carousel is controlled to move a first (or next) cartridge in the recipe to the dispenser. At step 1020, a dispense sub-process (as shown in FIG. 11) is executed. At step 1030, the circuitry determines if additional recipe elements are in the recipe. If this determination is "Yes" then the process repeats at step 1010. If this determination is "No" then the process ends. At this point, the apparatus may output a message to the user indicating that the composition corresponding to the recipe has been completely dispensed into to the container.

Figure 11A:
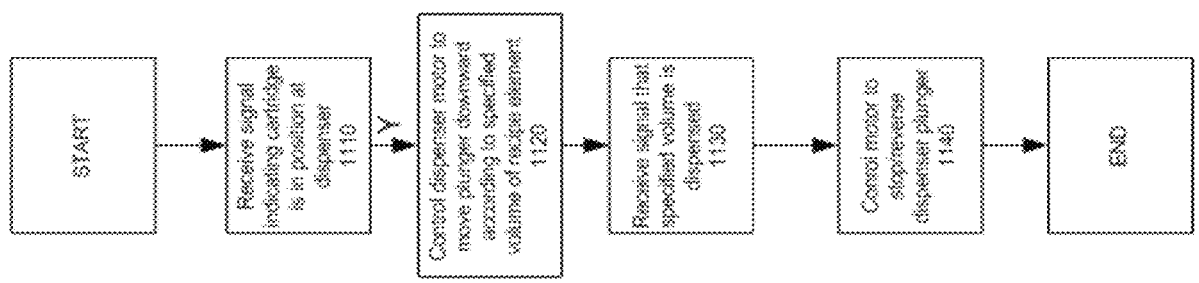
FIG. 11A shows an example of a process or algorithm for dispensing the composition from a cartridge into the output container according to an embodiment.

FIG. 11A shows an example of a process or algorithm performed by the circuitry for dispensing the composition from a cartridge into the output container. At step 1110, the circuitry receives a signal indicating the cartridge is in position at the dispenser. At step 1120, the circuitry controls the dispenser motor to move the plunger downward according to the specified volume of the recipe element. As described above, an indication of the volume may be provided by a load cell disposed in the cartridge or in the carousel, and circuitry will learn from the load cell when the target volume has been dispensed at step 1130. At this point, in step 1140, the circuitry will control the dispenser motor to stop and/or reverse the dispenser plunger movement, thus ending the dispensing sub-process.

Figure 11B:
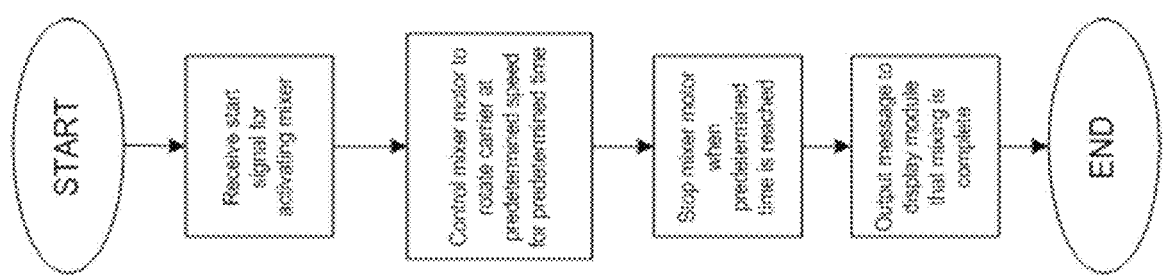
FIG. 11B shows an example of a process or algorithm performed for controlling the mixing process by the mixer according to an embodiment.

FIG. 11B shows an example of a process or algorithm performed for controlling the mixing process by the mixer 140. At step 1150, after a user of the blend apparatus 100 has inserted the output container into the mixer carrier and closed the access panel, the circuitry receives a start signal for activating the mixer. At step 1160, the circuitry controls the mixer motor to rotate the carrier at a predetermined speed for a predetermined time. For example, such a speed may be 1200 RPM or 2000 RPM, and a predetermined time may be 30 seconds or 60 seconds. At step 1170, when the predetermined time has been reached (or a stop signal is manually input by the user), the circuitry stops the mixer motor. At step 1180, the circuitry controls the display module 780 to output a message indicating that mixing is complete and the process then ends.

Figure 12:
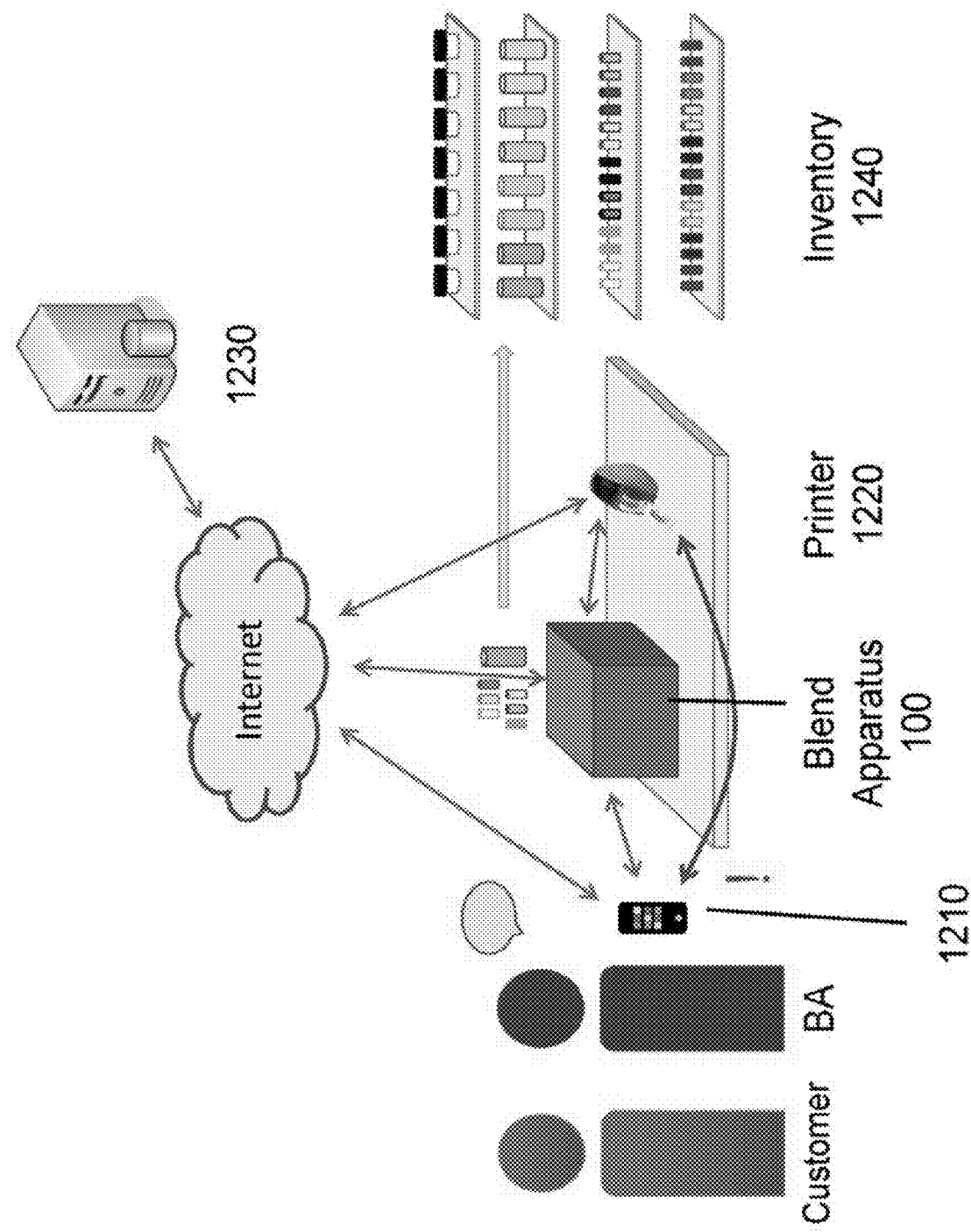
FIG. 12 shows an overall system which implements the blend apparatus according to an embodiment.

FIG. 12 shows a system 1200 which implements the apparatus 100 described above. As shown in FIG. 12, the system includes at least the apparatus 100, an information processing apparatus 1210, and a printer 1220. Optionally, the system may further include one or more external server devices or information processing apparatuses 1230 which are implemented as part of a cloud-computing environment. Furthermore, the system may optionally include inventory 1240 which is an inventory for booster compositions and base compositions to be inserted into the apparatus 100.

The information processing apparatus 1210 may be a personal computer (PC), a laptop computer, a PDA (Personal Digital Assistants), a smart phone, a tablet device, a UMPC (Ultra Mobile Personal Computer), a net-book, or a notebook type personal computer. In the below examples, the information processing apparatus 1210 is assumed to be a tablet device, such as an Apple iPad.

The printer 1220 may be any type of printing device or image forming device as understood in the art which has the capability of printing a label. In the below examples, the printing device is assumed to be a label printer, such as the Wireless Brother PTP750 W.

Each of the information processing apparatus 1210 and the printer 1220 are capable of performing wireless communication with the apparatus 100 by way of the Bluetooth interface on the apparatus 100. However, each of the information processing apparatus 1210 and the printer 1220 are also capable of having a wired connection to the apparatus 100 by way of the USB interface on the apparatus 100. Additionally, each device, including the apparatus 100, may communicate with each other and the external one or more devices through an internet connection via an 802.11 wireless connection to a wireless internet access point, or a physical connection to the internet access point, such as through an Ethernet interface. Each of the information processing apparatus 1210 and the printer 1220 are capable of performing wireless communication with each other through a Bluetooth connection or other wireless means as well.

The information processing apparatus 1210 is configured to receive information about a user for use in generating a recipe that will be used by the apparatus 100 to dispense a composition into the output container. The information processing apparatus 1210 may be operated by a "beauty advisor" (BA) working at the retail store that sells the dispensed composition to the customer user. However, the information processing apparatus 1210 can also be operated directly by the customer user.

Figure 13:
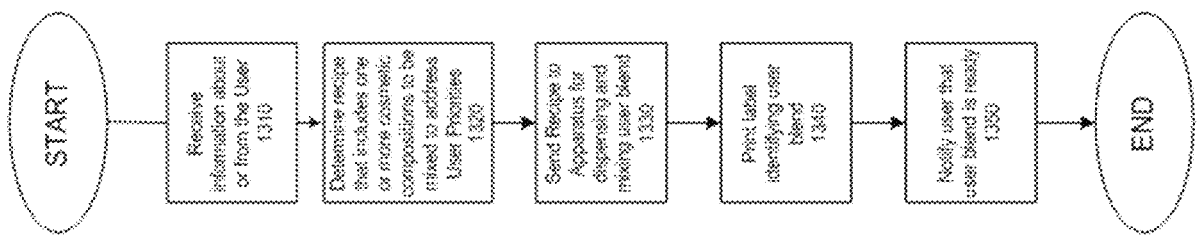
FIG. 13 shows a process performed by the system according to an embodiment.

A process performed by the system 1200 is shown on FIG. 13. In step 1310, the information processing apparatus 1210 receives information, which will be described in more detail below, about or from the user which will be used to determine the recipe for creating the user-specific blend that will be dispensed into the output container. In step 1320, a recipe is determined that includes one or more cosmetic compositions to be mixed to address the User's priorities. This determination may be performed by the circuitry of the information processing apparatus 1210, but it also may be determined in conjunction with or on another device all together. For instance, the information processing apparatus 1210 may provide the information received in step 1310 to the external server device 1230, and the circuitry of the external server device will determine the recipe. Alternatively, the information may be provided directly to the blend apparatus 100 which will determine the recipe. The final determined recipe will be outputted for display on the information processing apparatus 1210. In step 1330, the recipe determined in step 1320 will be provided to the blend apparatus 1330 over a wired or wireless connection, such as the Bluetooth connection, that exists between the information processing apparatus 1210 and the blend apparatus. The blend apparatus 100 will dispense the appropriate compositions according to the recipe into the output container and mix the blended composition as described in detail above. In step 1340, the printer 1220 will receive information on the user identification information and the blended composition in the output containter, and will print a label to be placed on the output container accordingly. The printer may receive this information from the blend apparatus 100, the information processing apparatus 1210, or the external server 1230. In step 1350, the user is notified that the blended composition is completed and ready for pick-up. This notification may come from either the information processing apparatus 1210, the apparatus 100, or the external server 1230, and the notification may be in the form of an e-mail to an e-mail address of the user that is stored in the system, or it could also be in the form of an SMS text message.

In a non-limiting example, the information processing apparatus 1210 is configured to output a series of questions to the user to collect information about the user for generating the recipe. However, alternative embodiments are also available in which the user enters information directly into appropriate fields displayed on the information processing apparatus 1210 without being prompted by displayed questions in order to input the information into the information processing apparatus 1210.

The information processing apparatus 1210 collects biographical information about the user, such as name, age, skin tone, or any other information which may be used to generate a profile of the user. For generating a recipe of the user, a series of questions or fields are presented to the user to generate preferences on types of skin conditions the user would like to address through the composition dispensed by the apparatus 100.

In addition to a questionnaire, an optional skin diagnosis may be performed by a skin diagnosis application as is known in the art.

Based on the responses to these questions, field entries, or skin diagnosis, the information processing apparatus 1210 will generate the recipe of booster and base compositions to be dispensed by the apparatus 100.

Figure 14A:
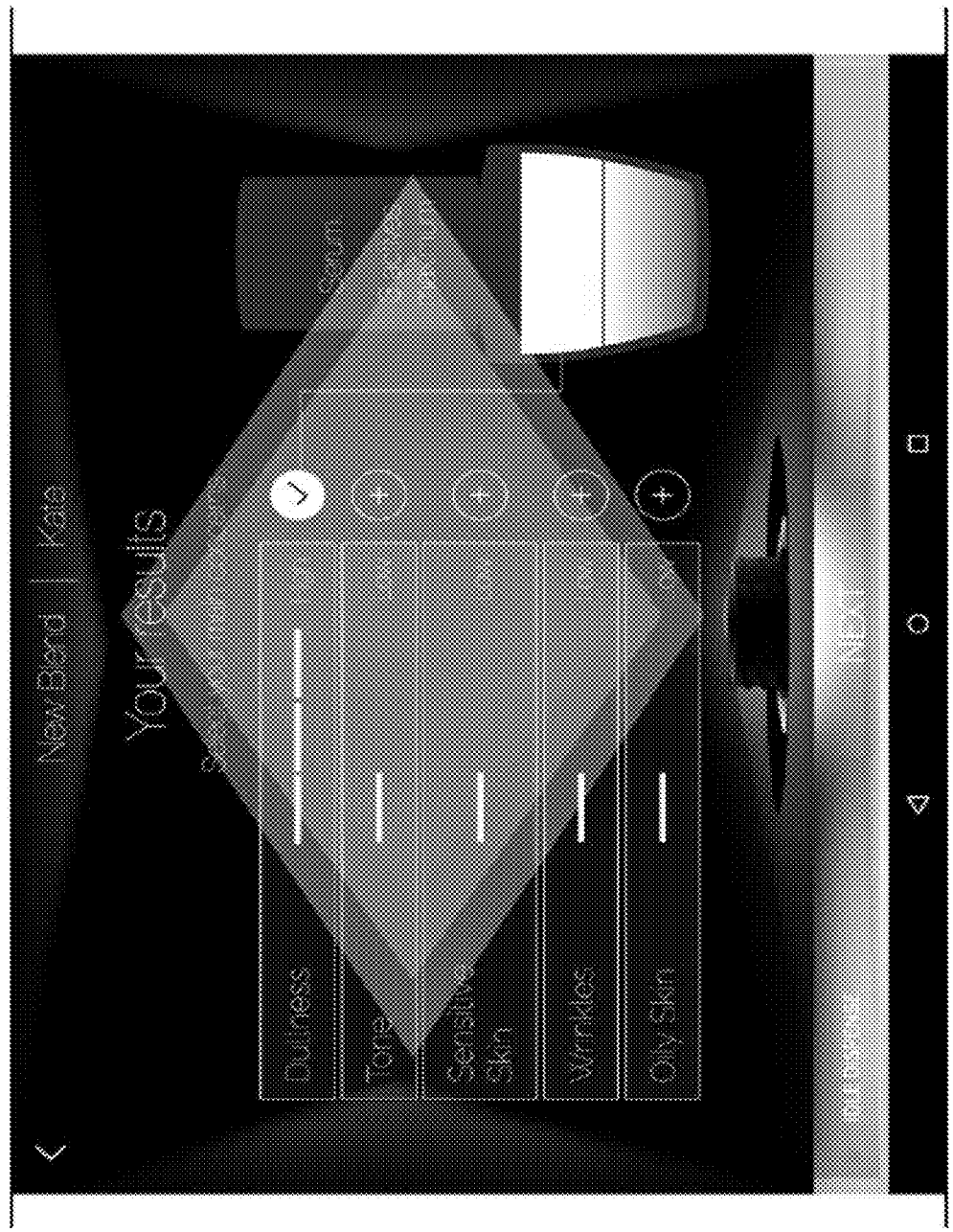
FIGS. 14A and 14B show an output screen of an information processing apparatus following a skin diagnosis in the system according to an embodiment.
Figure 14B:
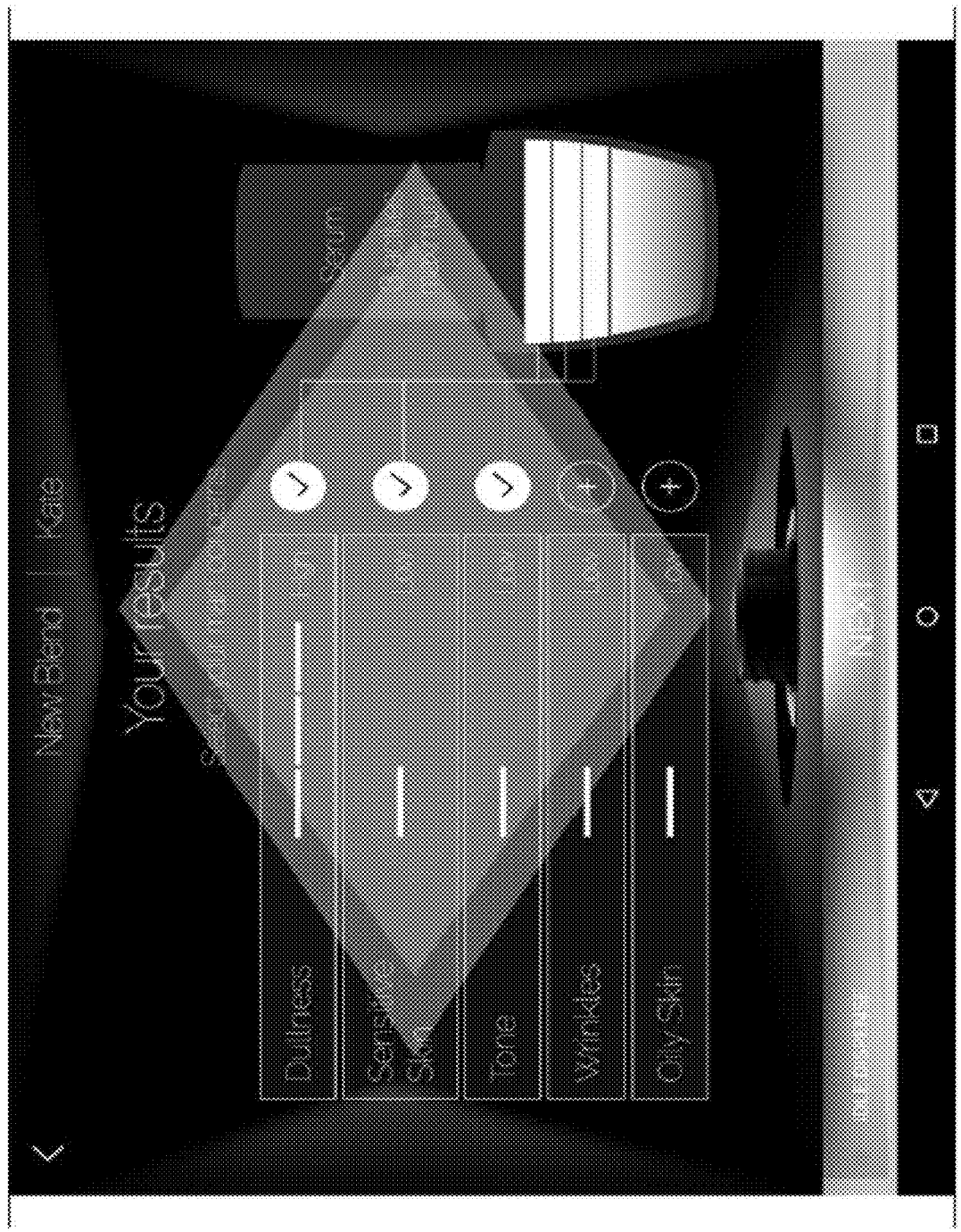

FIGS. 14A and 14B show an output screen of the information processing apparatus 1210 following a skin diagnosis. In this embodiment, the skin diagnosis (sometimes referred herein as a skin profile) determines the main concerns of the user based on an imaging operation performed on the user's face. The diagnosis may determine scores for categories of concern, such as, for example: skin dullness, sensitive skin, tone, wrinkles, or oily skin. Different devices for performing the skin diagnosis are readily understood in the art, such as the Lancome Diagnos ABS, HR Skinscope, Biotherm Bluesmart, Kiehl's Skinprofiler V.0, CA Dermanalyzer, and the Vichy Vichyconsult.

A three tiered weighting system is shown in FIG. 14A, where weights of "high", "low" and "medium" may be assigned to each area of concern by the skin diagnosis.

Each area of concern will then be available for selection to be addressed in the recipe. In the embodiment shown in FIG. 14A, a check mark is used to indicate a selection of an area of concern. As shown in FIG. 14A, the information processing apparatus may include a default selection of an area of "high" concern found in the skin diagnosis (such as "dullness" in this particular example). FIG. 14B then shows a user indicated selection of additional areas of concern which the user desires to be inputted into the recipe. In this particular non-limiting example, a maximum of 3 active booster compositions may be selected.

Figure 15:
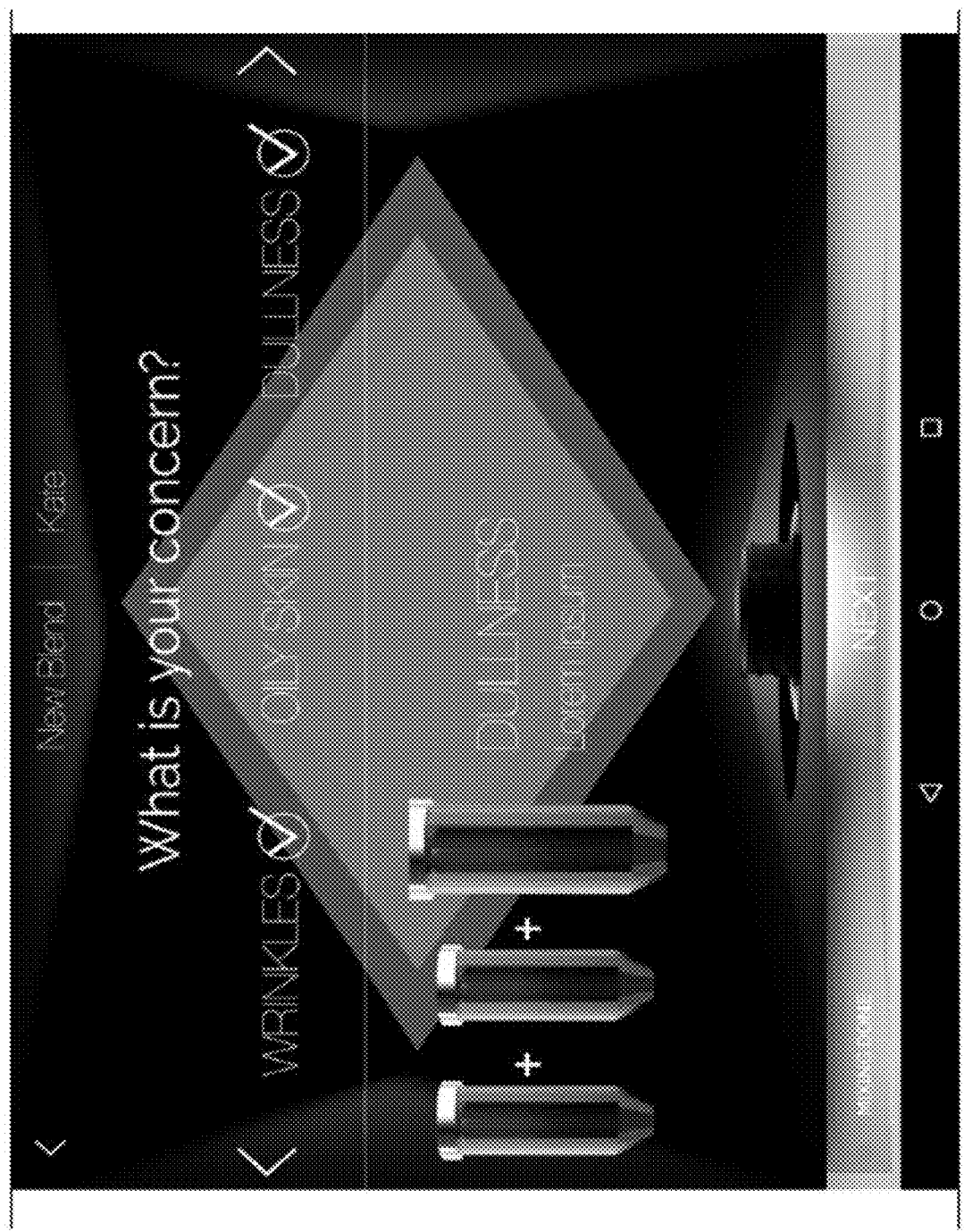
FIG. 15 shows an example of an output screen where a skin diagnosis is not performed in the system according to an embodiment.

FIG. 15 shows an example of an output screen where a skin diagnosis is not performed, and the user directly indicates their concerns to be inputted into the information processing apparatus for contribution to the generation of the recipe.

In a non-limiting example, there are five different booster compositions available for inclusion into the recipe.

A first booster composition is an "anti-aging" booster which addresses concerns such as skin sagging, lack of firmness, lines and wrinkles. Examples of such an anti-aging booster include retinol, retinol derivatives, ANOGEISSUS LEIOCARPUS BARK EXTRACT, HYDROLYZED RHODOPHYCEA EXTRACT, HYDROLYZED LINSEED EXTRACT, PSEUDOALTEROMONAS FERMENT EXTRACT, MANILKARA MULTINERVIS LEAF EXTRACT, LAVANDULA HYBRIDA OIL, GRIFOLA FRONDOSA FRUITING BODY EXTRACT, PLANTAGO LANCEOLATA LEAF EXTRACT, CYATHEA MEDULLARIS LEAF EXTRACT, HYDROLYZED HYALURONIC ACID, MALUS DOMESTICA FRUIT CELL CULTURE EXTRACT, RESVERATROL, SALICYLOYL PHYTOSPHINGOSINE)

A second booster composition is an "oily skin and imperfections booster which addresses concerns such as clogged pores, acne, blackhead, and shiny or greasy skin. Examples of such a booster include LENS ESCULENTA (LENTIL) SEED EXTRACT, SARCOSINE, PEUMUS BOLDUS LEAF EXTRACT, CRITHMUM MARITIMUM EXTRACT, NIACINAMIDE, SALICYLIC ACID, HYDROXYETHYLPIPERAZINE ETHANE SULFONIC ACID, SPIRAEA ULMARIA EXTRACT, PENTAERYTHRITYL TETRA-DI-T-BUTYL HYDROXYHYDROCINNAMATE).

A third booster composition is a "dullness and dryness" booster which addresses concerns such as rough, dull, and dry skin. Examples of such a booster include HYDROLYZED RICE PROTEIN, OPHIOPOGON JAPONICUS ROOT EXTRACT, CHENOPODIUM QUINOA SEED EXTRACT, TAMARINDUS INDICA SEED GUM, XYLITYLGLUCOSIDE (and) ANHYDROXYLITOL (and) XYLITOL, CERAMIDE derivatives, HELIANTHUS ANNUUS (SUNFLOWER) SEED OIL UNSAPONIFIABLES, MYRISTYL MALATE PHOSPHONIC ACID, MANNOSE, 2-OLEAMIDO-1,3-OCTADECANEDIOL).

A fourth booster composition is a "tone" booster which addresses concerns such as uneven tone, spots, and pigmentation. Examples of such a booster include ACETYL TRIFLUOROMETHYLPHENYL VALYLGLYCINE, Ascorbic acid and derivatives, PHENYLETHYL RESORCINOL, DIOSCOREA VILLOSA (WILD YAM) ROOT EXTRACT, HYDROXYPHENOXY PROPIONIC ACID, HYDROXYPALMITOYL SPHINGANINE, FERULIC ACID, SUCROSE DILAURATE (and) PISUM SATIVUIVI (PEA) EXTRACT, SACCHAROMYCES/XYLINUM/ BLACK TEA FERMENT, NELUIVIBO NUCIFERA FLOWER EXTRACT).

A fifth booster composition is a "sensitive skin" booster which addresses concerns such as redness, blotchy skin, and allergies. Examples of such a booster include MADECASSOSIDE, SACCHARIDE ISOMERATE, PALMITOYL TRIPEPTIDE-8, PANTHENOL, OLEA EUROPAEA (OLIVE) LEAF EXTRACT, MENTHA PIPERITA (PEPPERMINT) EXTRACT, LEONTOPODIUM ALPINUM EXTRACT, DIPOTASSIUM GLYCYRRHIZATE, ACETYL DIPEPTIDE-1 CETYL ESTER, ACETYL TETRAPEPTIDE-15, BOSWELLIA SERRATA EXTRACT, SODIUM PALMITOYL PROLINE (and) NYMPHAEA ALBA FLOWER EXTRACT).

Figure 16:
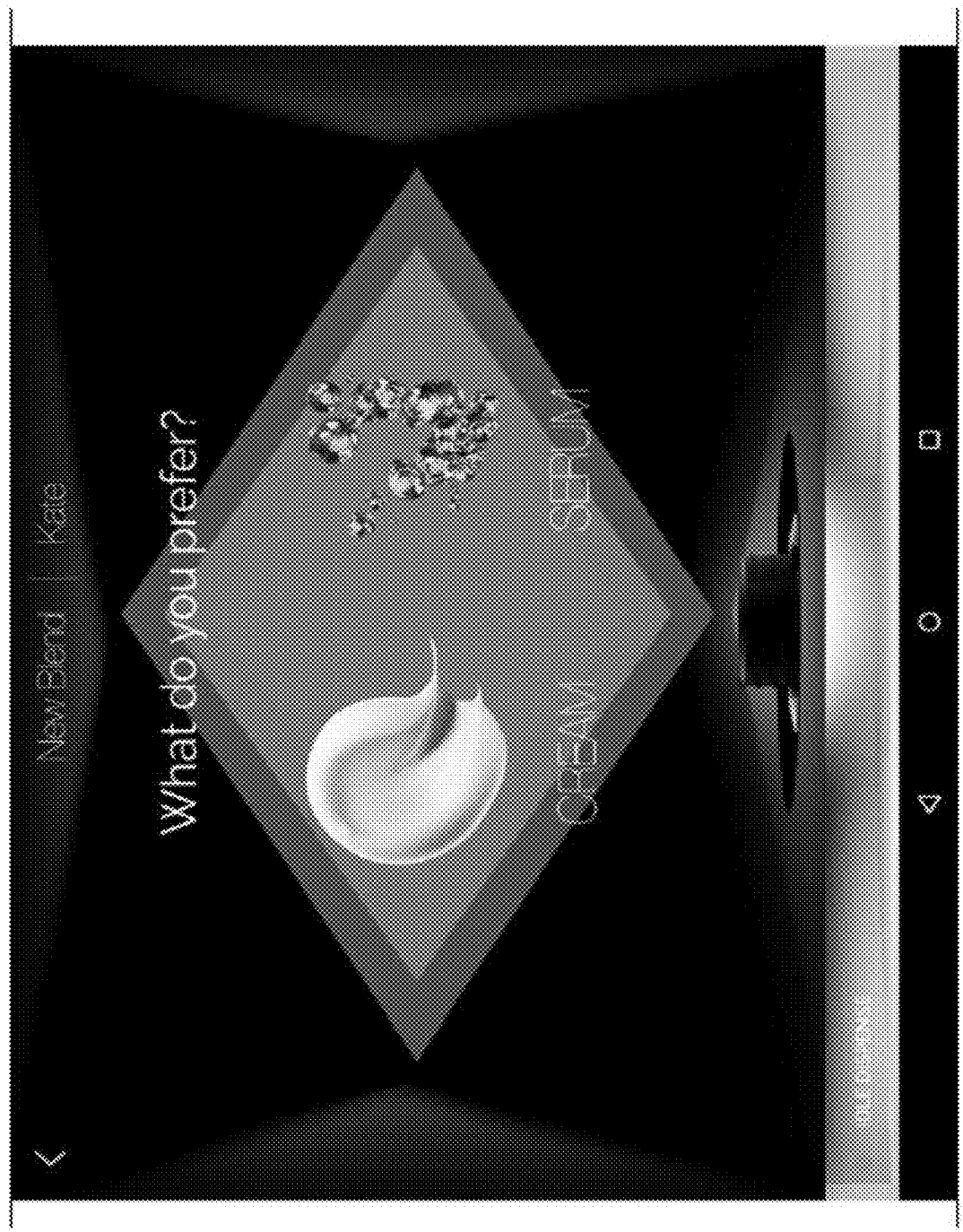
FIG. 16 shows an example of an output screen for prompting the user to select a type of base composition which will be included in the recipe according to an embodiment.

FIG. 16 shows an example of an output screen for prompting the user to select a type of base composition which will be included in the recipe. The selection in this example is between a cream base or a serum base.

Figure 17:
FIG. 17 shows an example of an output screen for prompting the user to select a type of texture of the blended composition between a light texture or a rich texture according to an embodiment.

FIG. 17 shows an example of an output screen for prompting the user to select a type of texture of the blended composition between a light texture or a rich texture. The selection of a light texture or a rich texture is a selection of what specific type of base composition will be used once the user has decided between a cream base or a serum base. As understood in the art, there are different types of cream bases, where one may be a light texture, such as convention oil-in-water emulsion cream with sugar esters as the primary emulsifier, and another may have a rich texture, such as water-in-oil emulsion cream with emulsifying silicone elastomer (KSG210) as the primary emulsifier. Similarly, an example of a light texture serum is one that is more watery upon application, such as emulsified gel with sodium hyaluronate. An example of a serum with rich texture is one that has good spreadability, such as emulsified gel with high concentrations of non-emulsifying silicone elastomer.

Figure 18:
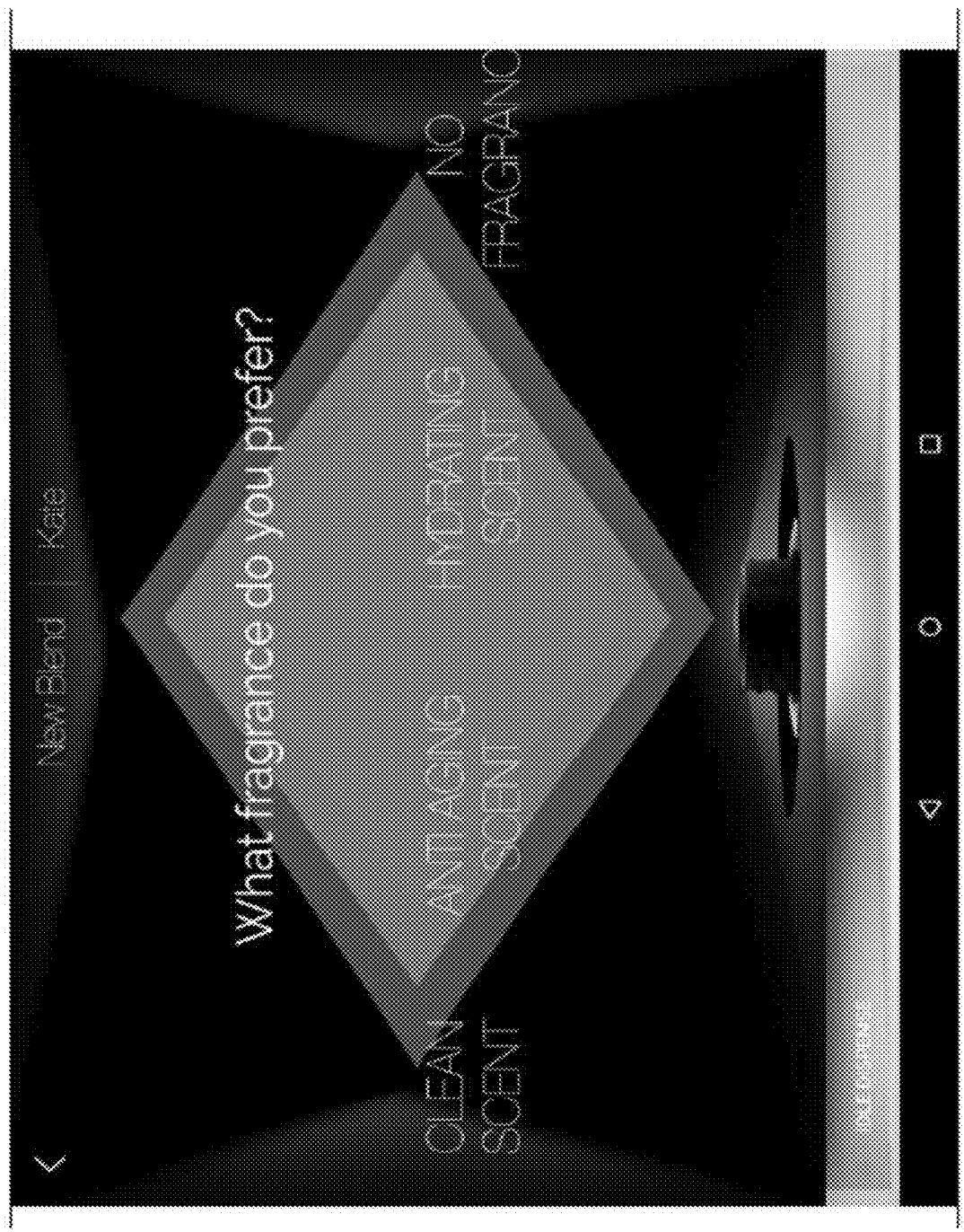
FIG. 18 shows an example of an output screen for prompting the user to select a type of fragrance which will be included in the recipe according to an embodiment.

FIG. 18 shows an example of an output screen for prompting the user to select a type of fragrance which will be included in the recipe between a clean scent, anti-aging scent, hydrating scent, or no scent. These types of fragrance booster compositions are readily understood in the art based on a combination of a perfume and a solvent base.

FIG. 19 shows an example of a set of rules used to determine the specific recipe for the user based on the priorities or concerns determined above. As shown in FIG. 19, it can be seen that in this example, out of the total blended composition, 90% will be made up of the base composition, and 10% will be made of the booster composition, with 1% being used for the fragrance booster. The individual remaining boosters will be used in multiples of 3% of the total blended composition. If only one skin concern is received as a top priority, then all 9% (3*3%) will be for the same booster.

If two skin concerns are given top priority, then there are two cases depending on the relative weight given to each of the two skin concerns. If the two skin concerns have the same weight, then a single 3% shot each of booster will be added to the recipe while an additional 3% shot of the base composition will be added as well. If one of the two skin concerns has a higher weight, then 6% (2*3%) will be used for the booster corresponding to the higher weighted skin concern, and 3% will be used for the booster corresponding to the lower weighted skin concern.

If three skin concerns are given top priority, then a single 3% shot of each booster corresponding to each skin concern will be added to the recipe.

Figure 20:
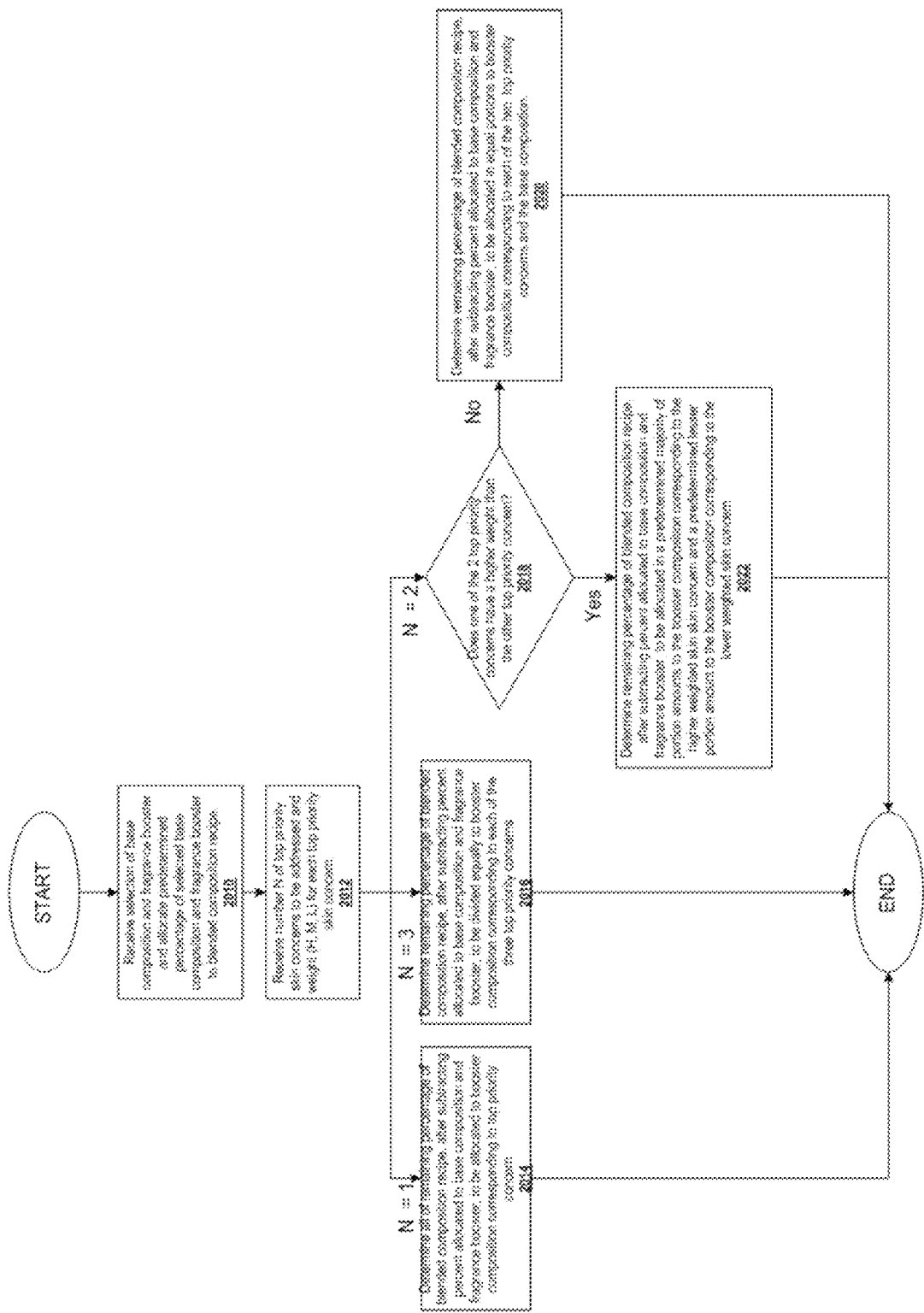
FIG. 20 shows a process or algorithm for determining the recipe according to an embodiment.

FIG. 20 shows a process or algorithm performed by the circuitry of the information processing apparatus for determining the recipe, as a combination of allocated percentages of the selected base composition, selected fragrance booster, and one or more booster compositions corresponding to the user's top priorities.

In step 2010, the circuitry receives a selection of the base composition and the fragrance booster and allocates predetermined percentages of the overall blended composition recipe to each of these selections respectively. In the set of rules shown in FIG. 19, an example is given in which the predetermined percentage allocated to the base composition is 90% and the predetermined percentage allocated to the fragrance booster is 1%.

In step 2012, the circuitry receives the number N of top priority skin concerns of the user, and also optionally receives a weight corresponding to each of the top priority skin concerns, such as high, medium, or low. If the number of top priority skin concerns is one, then the process proceeds to step 2014, where the circuitry determines that all of the remaining percentage of the blended composition recipe, after subtracting the percent already allocated to the base composition and the fragrance booster, is to be allocated to the booster composition which corresponds to the one top priority concern. As shown in the example set of rules in FIG. 19, when N=1 would result in 9% (3*3%) being allocated to the one top priority booster composition Alternatively, if N=3, the process proceeds to step 2016. In this step, the circuitry determines that the remaining percentage of the blended composition recipe, after subtracting the percent already allocated to the base composition and the fragrance booster, is to be divided equally to the booster composition corresponding to each of the three top priority concerns. As shown in the example set of rules in FIG. 19, when N=3 would result in 3% of each of the top priority booster compositions being allocated to the recipe.

Alternatively, N=2, the process proceeds to step 2018, where a further determination is made as to whether one of the two top priority concerns has a higher weight than the other top priority concern.

If each of the top priority concerns has an equal weight (such as both having a "medium" weight), then the process proceeds to step 2020, where the circuitry determines that the remaining percentage of the blended composition recipe, after subtracting the percent already allocated to the base composition and the fragrance booster, is to be allocated in equal portions to the booster composition corresponding to each of the two top priority concerns and the base composition. As shown in the example set of rules in FIG. 19, this would correspond to case A, where each of the top priority boosters receives 3% allocation, and the remaining 3% is allocated to an extra shot of the base composition. Thus, in this scenario, the base composition actually takes up 93% of the total blended composition recipe.

If one of the two top priority concerns from step 2018 has a higher weight than the other top priority concern, then the process proceeds to step 2022, where the circuitry determines that that the remaining percentage of the blended composition recipe, after subtracting the percent already allocated to the base composition and the fragrance booster, is to be allocated such that a predetermined majority of portion amounts is allocated to the higher priority booster, and a predetermined lesser amount is allocated to the lower priority booster. In the example of FIG. 19, this would mean that the higher priority booster receives a 6% (2*3%) allocation, and the lower priority booster receives a 3% allocation.

After the final allocated percentages of the selected base composition, selected fragrance booster, and one or more booster compositions corresponding to the user's top priorities are determined, the process ends and a final recipe has been determined. The final recipe can then be transmitted and/or stored to the blend apparatus 100. As mentioned above, the circuitry of the information processing apparatus, the external server, or the blend apparatus 100 may perform the process shown in FIG. 20.

Additionally, a different alogorithm may be utilized than the algorithm of FIG. 20 for determining the recipe. For instance, an algorithm may be utilized in which two main concerns are determined. Based on a two-dimension table with the first concerns on the X-axis and the second concerns on the Y-axis, a base is determined by the intersection of the two concerns in the table. After that, a questionnaire may be given to the consumer with a mix of diagnostic & lifestyle questions. Each positive answer to a question will be translated by a dose of a portion of one booster added to the recipe. Depending the number of boosters, the base volume will be adjusted between 100% and 90% of the total volume of the recipe.

At this point, the blend apparatus performs the process shown in FIG. 9, in which the current cartridges inserted in the carousel are checked against the base and booster cartridges required for the received recipe. If the required cartridges are not inserted, then the blend apparatus outputs a message (for example, on the display module 780) which informs a user of the blend apparatus (such as the beauty advisor—BA) that the correct cartridges need to be inserted.

As shown in FIG. 12, the BA may then retrieve the required cartridges from the inventory 1240 and insert the correct cartridges into the blend apparatus. During this process, when the top access panel of the blend apparatus 100 is opened and closed, the blend apparatus will perform a scan, using the NFC interface, to determine the currently installed cartridges. If the correct cartridges are installed, then the processes shown in FIGS. 10 and 11 will be performed to dispense and mix the blended composition.

Figure 21A:
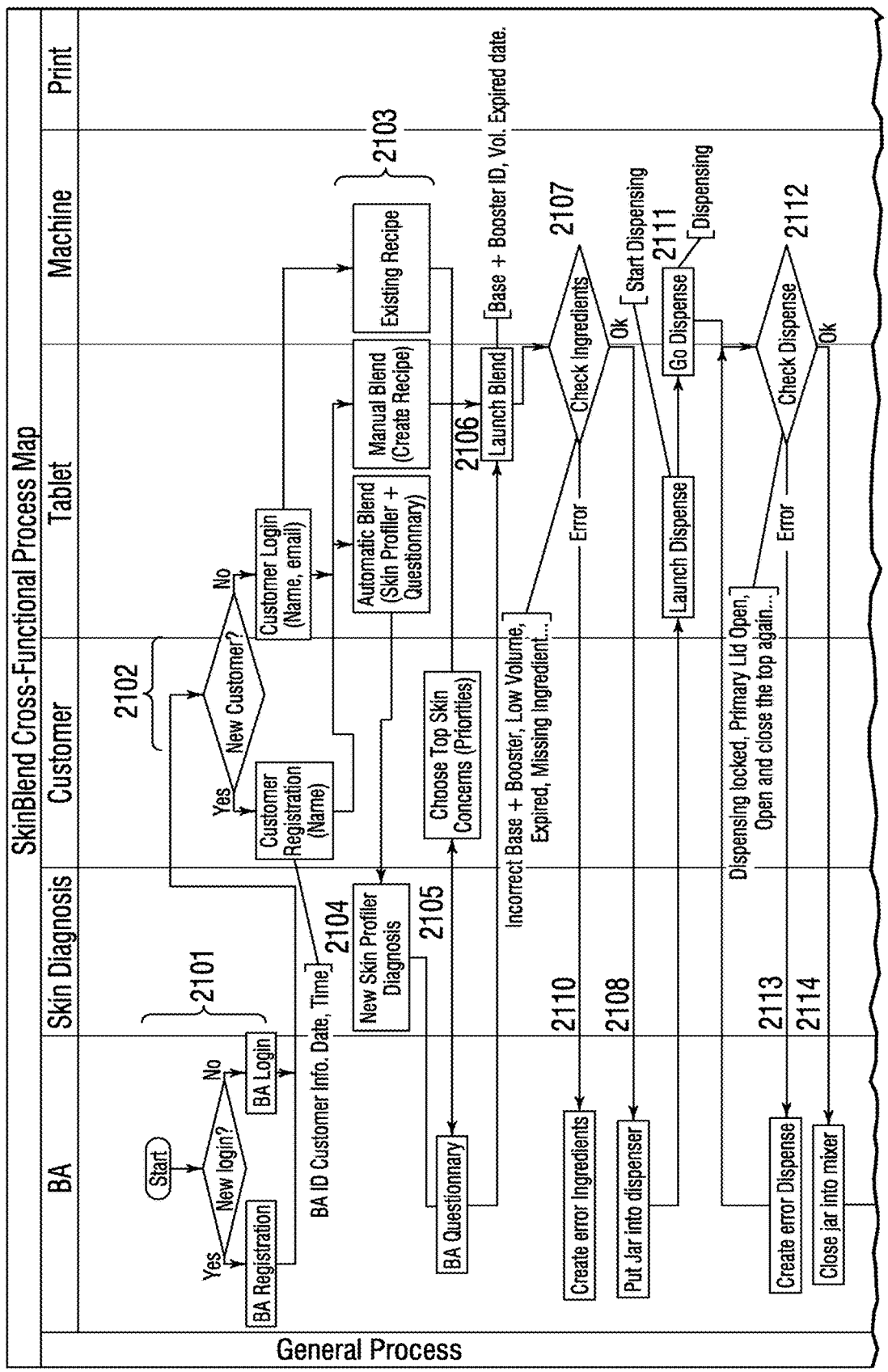
FIGS. 21A and 21B show a detailed flowchart which provides an example of how an end-to-end process may proceed using the system according to an embodiment.
Figure 21B:
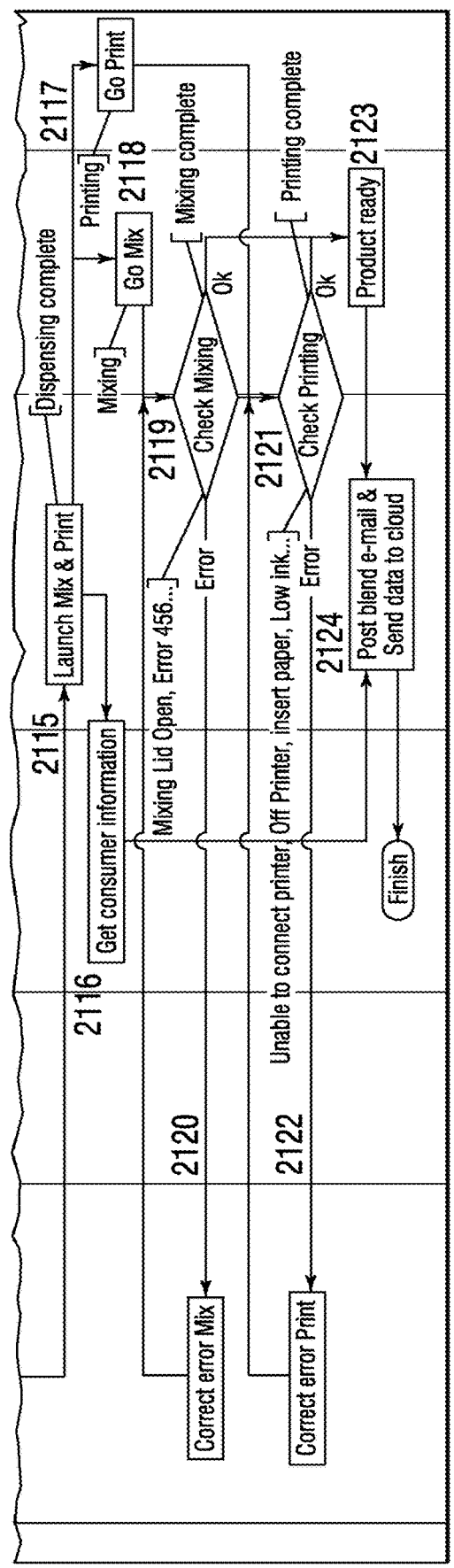

A detailed flowchart is shown in FIG. 21 which provides an example of how an end-to-end process may proceed using the system 1200 shown in FIG. 12.

A first sub-process 2101 is performed by the Beauty Advisory (BA) on the tablet device 1210 in which the BA will input registration information if the BA is logging in for the first time, otherwise the BA will input pre-existing login information. Then, a sub-process 2102 will be performed on the tablet 1210 in which the customer will input registration information if the customer is logging in for the first time, otherwise the customer will input pre-existing login information. Next, the a choice of a type of blend will be inputted into the tablet 1210 at step 2103. Either an automatic blend will be generated, a manual blend will be inputted, or a pre-existing recipe will be selected. When an automatic blend is selected, the process moves to 2104, where a skin diagnosis is performed. The skin diagnosis is performed by any one of the tools discussed above to identify areas of concern for the user as described above. After the results of the skin diagnosis are outputted, the BA will question the customer at step 2015 to determine the top skin concerns (priorities). Based on the top skin priorities, the recipe for the blend will be determined at step 2106. If the manual blend or a pre-existing recipe is selected at sub-process 2103, then these selections proceed directly to step 2106.

After the recipe for the blend is determined, the recipe is sent to the Apparatus/Machine 100 where the ingredients for the recipe are checked at step 2107. If the ingredients are ok, then the apparatus/machine 100 prompts the BA to put the jar (output container) into the dispensing area (2108), and then at step 2109 the process of blending and dispensing the ingredients into the output container is performed. If there is an error in the ingredient checking process, such as an incorrect base or booster cartridge being inserted in the apparatus 100, a low volume in one of the base or booster cartridges, an expired base or booster cartridge, or a missing base or booster cartridge, then the apparatus/machine 100 prompts the BA to correct the error at step 2110.

At step 2111, the dispensing process is underway. At step 2112, the dispensing may undergo an error due to a lock-up in one of the processes, or the primary lid being open. If there is an error during the dispensing process, the apparatus/machine 100 will prompt the BA to correct the error at step 2113. If the dispensing process proceeds without an error (OK at 2112), then the BA will be notified that dispensing is complete and the BA will be prompted to close the jar/output container and place the jar into the mixer at step 2114. Once the output container is placed into the mixer, and after the access panel is closed, the BA will start the mixer at step 2115. Simultaneously, or after the mixing step is completed, the tablet 1210 will retrieve consumer information (2116), such as an e-mail address, and transmit an instruction to the printer (2117) to print a label for the jar/output container.

At step 2118, the dispensing process is underway. At step 2119, the mixing may checked to determine if there is an error due to the primary lid being open. If there is an error during the mixing process, the apparatus/machine 100 will prompt the BA to correct the error at step 2120. If the mixing process proceeds without an error (OK at 2119), then the mixing is complete and the output container is ready.

At step 2121, the printing may checked to determine if there is an error due to a failed connection to the printer, the printer being off, the printer is low on ink, or there is no printing medium (such as labels) inserted. If there is an error during the printing process, the apparatus/machine 100 will prompt the BA to correct the error at step 2122. If the printing process proceeds without an error (OK at 2121), then the printing is complete.

When both the mixing and the printing is complete, then the final product is considered to be ready (2123). At this point, the tablet 1210 transmits an e-mail (or a text message) to the user based on the retrieved consumer information to notify the user that the final product is ready for pick-up. Additionally, a record of the final product in association with the consumer is transmitted to external device 1230 (i.e., posted to the "cloud"), and the process is complete.

Numerous modifications and variations of the present disclosure are possible in light of the above teachings. It is therefore to be understood that within the scope of the appended claims, the claimed invention may be practiced otherwise than as specifically described herein.

What is claimed is:

1. A system for providing a cosmetic composition to a user, comprising:
   an apparatus configured to dispense at least one cosmetic composition into a output container;
   a user interface configured to receive information about the user regarding a plurality of predetermined different types of skin issues the user seeks to address regarding the skin of the user and priority levels regarding the plurality of different types of skin issues the user seeks to address; and
   circuitry configured to receive the information about the user and determine one or more cosmetic compositions to be dispensed into the output container based on the information about the user received at the user interface, the priority levels, and a predetermined set of rules for combining the one or more cosmetic compositions to address different combinations of the predetermined different types of skin issues and to address different combinations of priority levels,
   wherein the apparatus is configured to hold a plurality of cartridges which contain a respective plurality of cosmetic compositions and the predetermined different types of skin issues are automatically addressed based on a plurality of different predetermined combinations of set amounts of one or more of the cosmetic compositions, wherein when one of the different types of skin issues is prioritized over other types of skin issues, a set amount of a cosmetic composition used to address the prioritized skin issue is automatically multiplied by a factor that varies based on how many total different types of skin issues the user seeks to simultaneously address.

2. The system according to claim 1, wherein the information about the user is information regarding the skin of the user.

3. The system according to claim 1, wherein the circuitry is configured to compare the information regarding the current plurality of cosmetic compositions contained in the apparatus to one or more cosmetic compositions required to be dispensed into the output container based on the information about the user, and to output information regarding any of the current plurality of cosmetic compositions contained in the apparatus which need to be removed from the apparatus, and any of the one or more cosmetic compositions required to be dispensed into the output container which need to be inserted into the apparatus.

4. The system according to claim 3, wherein the information regarding the current plurality of cosmetic compositions contained in the apparatus includes at least one of volume and expiration date information, and the circuitry is configured to output information regarding any of the current plurality of cosmetic compositions contained in the apparatus which need to be removed or replaced based on the volume or expiration date information.

5. The system according to claim 1, further comprising:
   a printer, wherein the circuitry is configured to control the printer to print a label describing at least one of an identifier of the user and the contents of the output container after the one or more cosmetic compositions are dispensed into the output container.

6. The system according to claim 1, wherein the user interface is implemented by a portable wireless device that communicates wirelessly with the apparatus.

7. The system according to claim 1, wherein the circuitry is configured to control storage data regarding the contents of the output container after the one or more cosmetic compositions are dispensed into the output container in association with information about the user at a memory located externally to the apparatus and the user interface device.

8. The system according to claim 1, wherein the circuitry is configured to control transmission of an electronic message to a destination address corresponding to the user after the one or more cosmetic compositions are dispensed into the output container.

9. The system according to claim 1, wherein the user interface is configured to receive information about preferred characteristics of the composition dispensed into the output container including information on at least a preferred fragrance, and wherein the predetermined rules include allocating a set percentage of the total dispensed formulation to a booster cartridge for providing the preferred fragrance.

10. A method, implemented by a system, for providing a cosmetic composition to a user, the system including an apparatus for dispensing at least one cosmetic composition as a total dispensed formulation into a output container, a user interface, and circuitry, the method comprising:
   receiving, at the user interface, information about the user regarding a plurality of predetermined different types of skin issues the user seeks to address regarding the skin of the user and priority levels regarding the plurality of different types of skin issues the user seeks to address and to address different combinations of priority levels; and
   receiving, by the circuitry, the information about the user and determining one or more cosmetic compositions to be dispensed into the output container based on the information about the user received at the user interface, the priority levels, and a predetermined set of rules for combining the one or more cosmetic compositions to address different combinations of the predetermined different types of skin issues,
   wherein the apparatus is configured to hold a plurality of cartridges which contain a respective plurality of cosmetic compositions and the predetermined different types of skin issues are automatically addressed based on a plurality of different predetermined combinations of set amounts of one or more of the cosmetic compositions, wherein when one of the different types of skin issues is prioritized over other types of skin issues, a set amount of a cosmetic composition used to address the prioritized skin issue is automatically multiplied by a factor that varies based on how many total different types of skin issues the user seeks to simultaneously address.

11. The method according to claim 10, wherein the information about the user is information regarding the skin of the user.

12. The method according to claim 10, further comprising comparing the information regarding the current plurality of cosmetic compositions contained in the apparatus to one or more cosmetic compositions required to be dispensed into the output container based on the information about the user, and outputting information regarding any of the current plurality of cosmetic compositions contained in the apparatus which need to be removed from the apparatus, and any of the one or more cosmetic compositions required to be dispensed into the output container which need to be inserted into the apparatus.

13. The method according to claim 12, wherein the information regarding the current plurality of cosmetic compositions contained in the apparatus includes at least one of volume and expiration date information, and the method includes outputting information regarding any of the current plurality of cosmetic compositions contained in the apparatus which need to be removed or replaced based on the volume or expiration date information.

14. The method according to claim 10, further comprising:
controlling a printer to print a label describing at least one of an identifier of the user and the contents of the output container after the one or more cosmetic compositions are dispensed into the output container.

15. The method according to claim 10, wherein the user interface is implemented by a portable wireless device that communicates wirelessly with the apparatus.

16. The method according to claim 10, further comprising controlling storage of data regarding the contents of the output container after the one or more cosmetic compositions are dispensed into the output container in association with information about the user at a memory located externally to the apparatus and the user interface device.

17. The method according to claim 10, further comprising controlling transmission of an electronic message to a destination address corresponding to the user after the one or more cosmetic compositions are dispensed into the output container.

18. The method according to claim 10, further comprising receiving information about preferred characteristics of the composition dispensed into the output container including information on at least a preferred fragrance, and wherein the predetermined rules include allocating a set percentage of the total dispensed formulation to a booster cartridge for providing the preferred fragrance.

19. A system for providing a cosmetic composition to a user, comprising:
means for dispensing at least one cosmetic composition into a output container;
means for receiving information about the user regarding a plurality of predetermined different types of skin issues the user seeks to address regarding the skin of the user and priority levels regarding the plurality of different types of skin issues the user seeks to address; and
means for receiving the information about the user and determine one or more cosmetic compositions to be dispensed into the output container based on the information about the user received at the user interface, the priority levels, and a predetermined set of rules for combining the one or more cosmetic compositions to address different combinations of the predetermined different types of skin issues and to address different combinations of priority levels,
wherein the means for dispensing is configured to hold a plurality of cartridges which contain a respective plurality of cosmetic compositions and the predetermined different types of skin issues are automatically addressed based on a plurality of different predetermined combinations of set amounts of one or more of the cosmetic compositions, wherein when one of the different types of skin issues is prioritized over other types of skin issues, a set amount of a cosmetic composition used to address the prioritized skin issue is automatically multiplied by a factor that varies based on how many total different types of skin issues the user seeks to simultaneously address.

* * * * *

UNITED STATES PATENT AND TRADEMARK OFFICE
CERTIFICATE OF CORRECTION

PATENT NO. : 11,315,159 B2
APPLICATION NO. : 16/811104
DATED : April 26, 2022
INVENTOR(S) : Guive Balooch et al.

It is certified that error appears in the above-identified patent and that said Letters Patent is hereby corrected as shown below:

On the Title Page

In Column 2, Item (57), under "ABSTRACT", Line 4, delete "a" and insert -- an --, therefor.

In the Claims

In Column 15, Claim 1, Line 29, delete "a" and insert -- an --, therefor.

In Column 16, Claim 10, Line 45, delete "a" and insert -- an --, therefor.

In Column 18, Claim 19, Line 16, delete "a" and insert -- an --, therefor.

Signed and Sealed this
Nineteenth Day of July, 2022

Katherine Kelly Vidal
*Director of the United States Patent and Trademark Office*